(12) United States Patent
Naito et al.

(10) Patent No.: US 11,209,081 B2
(45) Date of Patent: Dec. 28, 2021

(54) CONTROL APPARATUS FOR LINEAR SOLENOID VALVE

(71) Applicant: TOYOTA JIDOSHA KABUSHIKI KAISHA, Toyota (JP)

(72) Inventors: Shuma Naito, Toyota (JP); Atsushi Tabata, Okazaki (JP); Kota Fujii, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 16/706,967

(22) Filed: Dec. 9, 2019

(65) Prior Publication Data

US 2020/0191262 A1 Jun. 18, 2020

(30) Foreign Application Priority Data

Dec. 14, 2018 (JP) .............................. JP2018-234913

(51) Int. Cl.
*F16H 61/02* (2006.01)
*B60K 6/36* (2007.10)
(Continued)

(52) U.S. Cl.
CPC ......... *F16H 61/0251* (2013.01); *B60K 6/365* (2013.01); *B60K 6/445* (2013.01); *F16H 59/14* (2013.01); *F16H 61/0021* (2013.01); *F16H 61/0031* (2013.01); *F16H 61/0204* (2013.01); *F16H 61/40* (2013.01); *F16H 63/40* (2013.01); *Y02T 10/62* (2013.01)

(58) Field of Classification Search
None
See application file for complete search history.

(56) References Cited

U.S. PATENT DOCUMENTS 6,007,160 A * 12/1999 Lubbers .................. B60T 7/042
188/358
6,361,472 B1 3/2002 Murasugi
(Continued)

FOREIGN PATENT DOCUMENTS

DE          103 15 152 A1    10/2004
DE   10 2018 100 180 A1     7/2018
(Continued)

*Primary Examiner* — Colby M Hansen
(74) *Attorney, Agent, or Firm* — Oliff PLC

(57) ABSTRACT

A control apparatus for a linear solenoid valve configured to regulate a hydraulic pressure in a vehicle transmission. The control apparatus includes a hydraulic control portion configured to output a control command signal that is applied to a solenoid of the linear solenoid valve. The hydraulic control portion outputs, as the control command signal, a regulating control command signal by which the hydraulic pressure is to be regulated to a regulated pressure value that is dependent on a vehicle driving state. When the regulated pressure value is in a certain pressure range in which vibration-based noise is likely to be generated by vibration of the linear solenoid valve that is operated with the regulating control command signal being applied to the solenoid, the hydraulic control portion outputs, as the control command signal, a noise-restraining command signal by which generation of the vibration-based noise is restrained.

6 Claims, 7 Drawing Sheets

(51) Int. Cl.
*B60K 6/44* (2007.10)
*F16H 61/40* (2010.01)
*F16H 63/40* (2006.01)
*F16H 59/14* (2006.01)
*F16H 61/00* (2006.01)
*B60K 6/445* (2007.10)
*B60K 6/365* (2007.10)

(56) References Cited

U.S. PATENT DOCUMENTS

| | | | | |
|---|---|---|---|---|
| 7,600,623 | B1 * | 10/2009 | Pinto | F16D 35/025 |
| | | | | 192/58.682 |
| 9,732,680 | B2 * | 8/2017 | Teraya | F01L 9/20 |
| 2006/0165026 | A1 * | 7/2006 | Apneseth | H04B 7/2643 |
| | | | | 370/322 |
| 2008/0006029 | A1 * | 1/2008 | Kitou | F16H 61/12 |
| | | | | 60/459 |
| 2011/0071743 | A1 * | 3/2011 | Taniguchi | B60T 8/4872 |
| | | | | 701/70 |
| 2017/0049061 | A1 * | 2/2017 | Khabbaz | G05D 7/0664 |
| 2017/0268661 | A1 | 9/2017 | Noda et al. | |
| 2018/0194356 | A1 | 7/2018 | Richards et al. | |
| 2019/0048777 | A1 * | 2/2019 | Rollinger | F01N 13/008 |

FOREIGN PATENT DOCUMENTS

| | | |
|---|---|---|
| JP | 2000-314471 A | 11/2000 |
| JP | 2008-133926 A | 6/2008 |
| JP | 6227798 B2 | 11/2017 |
| WO | 2016/052745 A1 | 4/2016 |

* cited by examiner

| AT GEAR POSITION | C1 | C2 | B1 | B2 | F1 |
|---|---|---|---|---|---|
| 1st | ◯ |  |  | △ | ◯ |
| 2nd | ◯ |  | ◯ |  |  |
| 3rd | ◯ | ◯ |  |  |  |
| 4th |  | ◯ | ◯ |  |  |

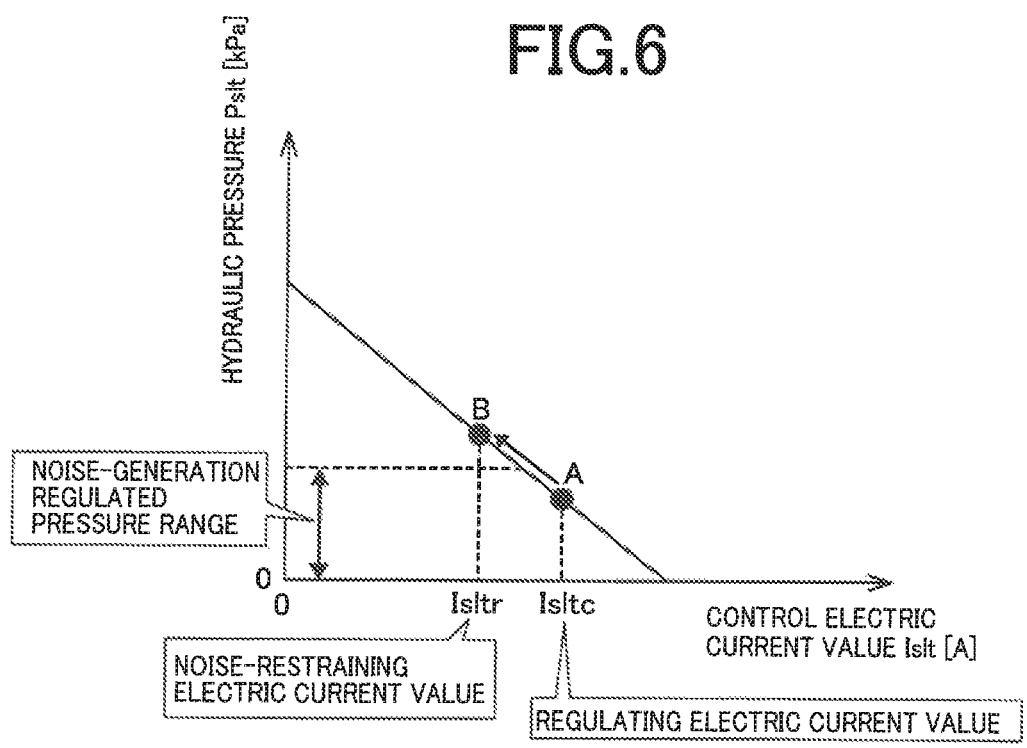

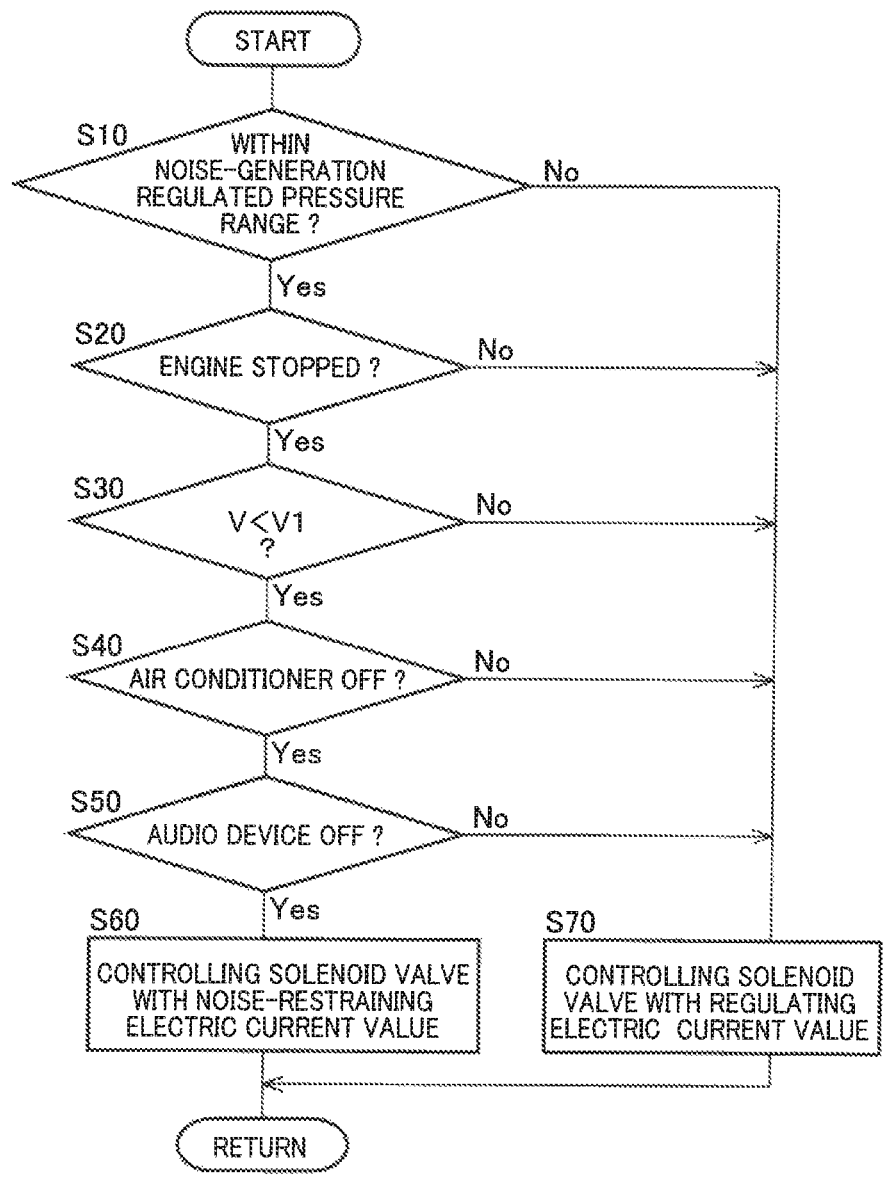

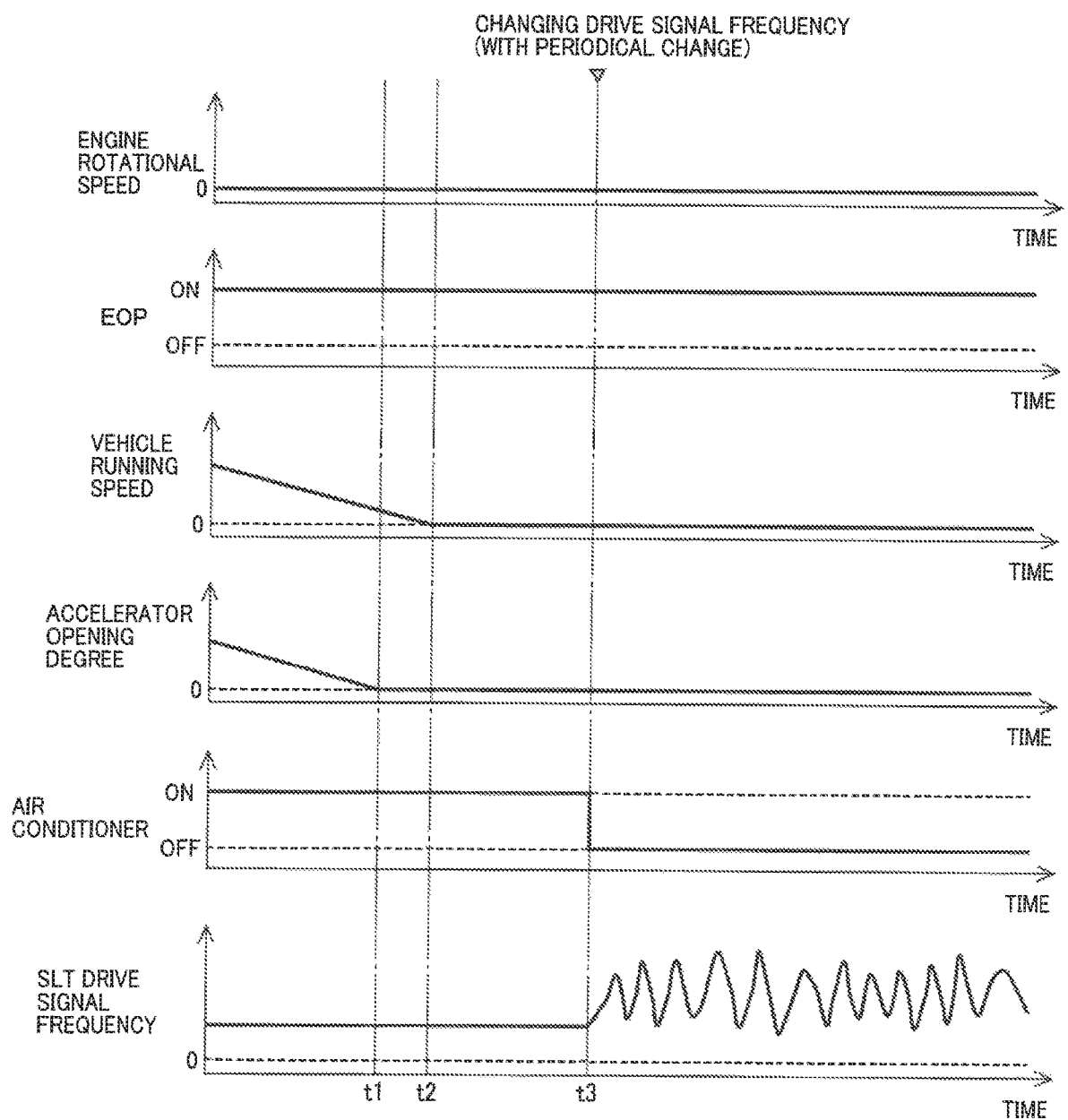

CONTROL APPARATUS FOR LINEAR SOLENOID VALVE

CONTROL APPARATUS FOR LINEAR SOLENOID VALVE

This application claims priority from Japanese Patent Application No. 2018-234913 filed on Dec. 14, 2018, the disclosure of which is herein incorporated by reference in its entirety.

FIELD OF THE INVENTION

The present invention relates to a control apparatus for a linear solenoid valve configured to regulate a hydraulic pressure in a transmission that is be provided in a vehicle.

BACKGROUND OF THE INVENTION

There is well-known a control apparatus for a linear solenoid valve configured to regulate a hydraulic pressure in a transmission that is to be provided in a vehicle. An automatic-transmission hydraulic control apparatus disclosed in JP2008-133926A is an example of such a control apparatus. This Japanese Patent Application Publication teaches that (i) an output of an control electric voltage applied to a solenoid of a solenoid valve is controlled, (ii) a kind of idle sound (such as an impact sound generated upon abutting contact of an armature of the solenoid, valve with a stopper) is generated in the solenoid valve when the solenoid valve is activated without the solenoid valve being filled with a working fluid, and (iii) when the solenoid valve is not filled with the working fluid, the control electric voltage is changed to a noise-preventing control electric voltage from a normal control electric voltage that is to be used when the solenoid valve is filled with the working fluid, for thereby restraining generation of the idle sound.

SUMMARY OF THE INVENTION

By the way, even in a pressure regulating state of the linear solenoid valve in which the linear solenoid valve is filled with the working fluid so as to be able to output the hydraulic pressure regulated to a pressure value in accordance with the control command signal applied to the linear solenoid valve, there is a case in which the linear solenoid valve is vibrated, for example, due to pulsation of the outputted hydraulic pressure, depending on a level of the control command signal, so that the vibration of the linear solenoid valve is likely to cause noise made by contact of a valve body with the linear solenoid valve that is received in the valve body.

The present invention was made in view of the background art described above. It is therefore an object of the present invention to provide a control apparatus for a liner, solenoid valve, which is capable of restraining generation of noise resulting from the vibration of the linear solenoid valve in a pressure regulating state of the linear solenoid valve.

The object indicated above is achieved according to the following aspects of the present invention.

According to a first aspect of the invention, there is provided a control apparatus for a linear solenoid valve configured to regulate a hydraulic pressure in a transmission that is to be provided in a vehicle, the control apparatus comprising a hydraulic control portion configured to output a control command signal that is applied to a solenoid of the linear solenoid valve, wherein the hydraulic control portion is configured to output, as the control command signal, a regulating control command signal by which the hydraulic pressure is to be regulated to a regulated pressure value that is dependent on a driving state of the vehicle, and wherein, when the regulated pressure value is in a certain pressure range in which vibration-based noise is likely to be generated by vibration of the linear solenoid valve that is operated with the regulating control command signal being applied to the solenoid, the hydraulic control portion is configured to output, as the control command signal, a noise-restraining command signal by which generation of the vibration-based noise is restrained. The control apparatus may further comprises a state determining portion configured to determine whether the regulated pressure value dependent on the driving state of the vehicle is in the certain pressure range, Wherein the hydraulic control portion is configured to output the noise-restraining command signal as the control command signal, when the state determining portion determines that the regulated pressure value is in the certain pressure range.

According to a second aspect of the invention, in the control apparatus according to the first aspect of the invention, the control command signal generates or constitutes a control electric current that is applied to the solenoid of the linear solenoid valve, wherein a value of the control electric current of the noise-restraining command signal is a noise-restraining electric current value by which the hydraulic pressure is regulated outside the certain pressure range.

According to a third aspect of the invention, in the control apparatus according to the first aspect of the invention, the control command signal generates or constitutes a drive signal that is applied to the solenoid of the linear solenoid valve, Wherein a frequency of the drive signal of the regulating control command signal is a regulating drive-signal frequency, and wherein a frequency of the drive signal of the noise-restraining command signal is a noise-restraining drive-signal frequency that is different from the regulating drive-signal frequency.

According to a fourth aspect of the invention, in the control apparatus according to the third aspect of the invention, the noise-restraining drive-signal frequency is periodically changed.

According to a fifth aspect of the invention, in the control apparatus according to any one of the first through fourth aspects of the invention, there is further provided with a state determining portion configured to determine whether a background noise in an interior of the vehicle is in a vibration-based-noise audible level in which the vibration-based noise is audible in the interior of the vehicle, wherein the hydraulic control portion is configured, when the state determining portion determines that the background noise in the interior of the vehicle is in the vibration-based-noise audible level, to output, as the control command signal, the noise-restraining command signal in place of the regulating control command signal, in a case in which the regulated pressure value is in the certain pressure range, and wherein the hydraulic control portion is configured, when the state determining portion determines that the background noise in the interior of the vehicle is not in the vibration-based-noise audible level, to output the regulating control command signal as the control command signal, even in the case in which the regulated pressure value is in the certain pressure range.

In the control apparatus according to the first aspect of the invention, the hydraulic control portion is configured to output the control command signal that is applied to the solenoid of the linear solenoid valve, and is configured to output, as the control command signal, the regulating control command signal by which the hydraulic pressure is to be regulated to the regulated pressure value that is dependent on the driving state of the vehicle. When the regulated pressure value is in the certain pressure range in which vibration-based noise is likely to be generated by vibration of the linear solenoid valve that is operated with the regulating control command signal being applied to the solenoid, the hydraulic control portion is configured to output, as the control command signal, the noise-restraining command signal by which generation of the vibration-based noise is restrained, Thus, in the pressure regulating state of the linear solenoid valve, it is possible to restrain generation of the vibration-based noise resulting from the vibration of the linear solenoid valve.

In the control apparatus according to the second aspect of the invention, the control command signal generates or constitutes the control electric current that is applied to the solenoid of the linear solenoid valve, wherein the value of the control electric current of the noise-restraining command signal is the noise-restraining electric current value by which the hydraulic pressure is regulated outside the certain pressure range. Where a drive signal frequency in the control command signal is changed, there is a possibility that heat generation of switching elements provided to generate the control command signal could be problematic. However, in the control apparatus according to the second aspect of the invention, it is possible to avoid use of the control command signal by which the regulated pressure value of the hydraulic pressure is in the certain pressure range, while avoiding such a heat generation of the switching elements. Thus, the vibration-based noise resulting from the vibration of the linear solenoid valve can be restrained without problem of the heat generation of the switching elements.

In the control apparatus according to the third aspect of the invention, the control command signal generates or constitutes the drive signal that is applied to the solenoid of the linear solenoid valve, wherein the frequency of the drive signal of the regulating control command signal is the regulating drive-signal frequency, and wherein the frequency of the drive signal of the noise-restraining command signal is the noise-restraining drive-signal frequency that is different from the regulating drive-signal frequency. Where the control electric current value in the control command signal is changed, there is a possibility that an increase of load acting on a pump configured to output a working fluid serving as an original pressure of the hydraulic pressure could be problematic. However, in the control apparatus according to the third aspect of the invention, it is possible to restrain pulsation of the hydraulic pressure outputted from the liner solenoid valve, while avoiding such a problematic increase of the load acting on the pump. Thus, the vibration-based noise resulting from the vibration of the linear solenoid valve can be restrained without problem of the increase of the pump load.

In the control apparatus according to the fourth aspect of the invention, the noise-restraining drive-signal frequency is periodically changed, so that a tone of the vibration-based noise resulting from the vibration of the linear solenoid valve is changed in addition to reduction of the pulsation of the hydraulic pressure outputted from the linear solenoid valve. Thus, it is possible to make the vibration-based noise further less sensible or audible to an operator of the vehicle.

In the control apparatus according to the fifth aspect of the invention, the hydraulic control portion is configured, when the state determining portion determines that the background noise in the interior of the vehicle is in the vibration-based-noise audible level, to output, as the control command signal, the noise-restraining command signal in place of the regulating control command signal, in the case in which the regulated pressure value is in the certain pressure range. Thus, the generation of the vibration-based noise resulting from the vibration of the linear solenoid valve can be restrained in the state in which the vibration-based noise is hardly absorbed in the background noise and is audible and distinguished from the background noise. On the other hand, the hydraulic control portion is configured, when the state determining portion determines that the background noise in the interior of the vehicle is not in the vibration-based-noise audible level, to output the regulating control command signal as the control command signal, even in the case in which the regulated pressure value is in the certain pressure range. Thus, in the state in which the vibration-based noise is easily absorbed in the background noise and is hardly audible to be distinguished from the background noise, it is possible to avoid unnecessary increase of load of the pump supplying the working fluid and to avoid unnecessary heat generation of the switching elements provided to generate the drive pulse signals.

BRIEF DESCRIPTION OF THE DRAWINGS

FIG. 6 is a view for showing a relationship between a control electric current value and a pilot pressure in a solenoid valve SIT, and explaining, by way of example, a case in which the noise-restraining electric current value is used in place of the regulating electric current value;

FIG. 7 is a flow chart showing a main part of a control routine executed by the electronic control apparatus shown in FIG. 1, namely, a control routine that is executed for restraining noise generated by vibration of the solenoid valve SIX that is operated to regulate a hydraulic pressure in the step-variable transmission portion; and FIG. 8 is a time chart showing, by way of example, a case in which a second processing is executed at step S60 of the control routine shown in FIG. 7, according to another embodiment of the invention, which is other than an embodiment of the invention shown in FIG. 6.

DETAILED DESCRIPTION OF PREFERRED EMBODIMENTS

In the embodiments of the present invention, the term "gear ratio" in the transmission for a vehicle is defined as "rotational speed of input-side rotary member/rotational speed of output-side rotary member". A running speed of the vehicle could be lower as the gear ratio is higher, and could be higher as the gear ratio is lower. The highest gear ratio can be expressed also as a lowest-speed gear ratio.

Hereinafter, preferred embodiments of the invention will be described in detail with reference to the accompanying drawings.

First Embodiment

Figure 1:
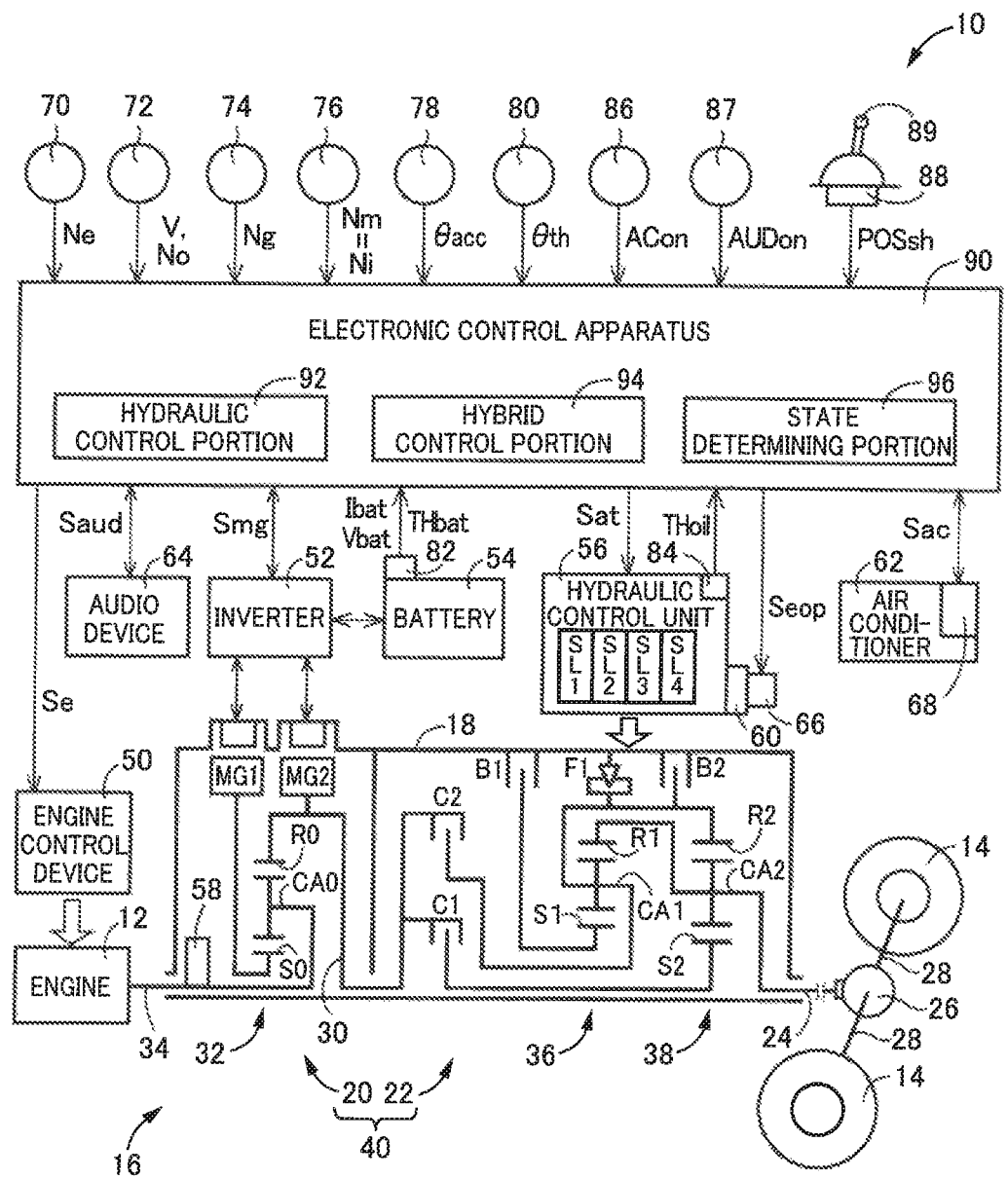
FIG. 1 is a schematic view showing a construction of a vehicle to be controlled by an electronic control apparatus according to an embodiment of the present invention, and major control functions and control portions of the control apparatus.

FIG. 1 is a schematic view showing a construction of a vehicle 10 to be controlled by an electronic control apparatus 90 according to an embodiment of the present invention, and major control functions and control portions of the control apparatus 90. As shown in FIG. 1, the vehicle 10 is provided with an engine 12, a first rotating machine MG1 and a second rotating machine MG2. Further, the vehicle 10 is provided with also drive wheels 14 and a drive-force transmitting device 16 that is disposed in a drive-force transmitting path between the engine 12 and the drive wheels 14.

The engine 12 is a known internal combustion engine such as gasoline engine and diesel engine, Which serves as a drive force source capable of generating a drive torque. The vehicle 10 is provided with an engine control device 50 that includes a throttle actuator, a fuel injection device and an ignition device. With the engine control device 50 being controlled by the electronic control apparatus 90, an engine torque Te, which is an output torque of the engine 12, is controlled.

Each of the first and second rotating machines MG1, MG2 is a rotating electric machine having a function of an electric motor and a function of a generator. That is, each of the first and second rotating machines MG1, MG2 is a so-called "motor generator". The first and second rotating machines MG1, MG2 are connected to an electric storage device in the form of a battery 54 provided in the vehicle 10, through an inverter 52 provided in the vehicle 10. The inverter 52 is controlled by the electronic control apparatus 90 whereby an MG1 torque Tg and an MG2 torque Tin as output torques of the respective first and second rotating machines MG1, MG2 are controlled. The output torque of each of the first and second rotating machines MG1, MG2 serves as a power running torque when acting as a positive torque for acceleration, and serves as a regenerative torque when acting as a negative torque for deceleration. The battery 54 is the electric storage device to and from which an electric power is supplied from and to the first rotating machine MG1 and the second rotating machine MG2.

The drive-force transmitting device 16 includes a non-rotary member in the form of a casing 18 that is attached to a body of the vehicle 10, an electrically-operated continuously-variable transmission portion 20 and a mechanically-operated step-variable transmission portion 22. The continuously-variable transmission portion 20 and the step-variable transmission portion 22 are provided within the casing 18, and are arranged in a series on a common axis. The continuously-variable transmission portion 20 is connected to the engine 12 directly or indirectly through, for example, a damper (not shown). The step-variable transmission portion 22 is connected to an output rotary member of the continuously-variable transmission portion 20. The drive-force transmitting device 16 further includes a differential gear device 26 connected to an output shaft 24 that is an output rotary member of the step-variable transmission portion. 22, and a pair of axles 28 connected to the differential gear device 26. In the drive-force transmitting device 16, a drive force outputted from the engine 12 or the second rotating machine MG2 is transmitted to the step-variable transmission portion 22, and is then transmitted from the step-variable transmission portion 22 to the drive wheels 14 through the differential gear device 26, for example. The drive force is synonymous with a drive torque or a drive power unless otherwise distinguished from them. It is noted that the drive-force transmitting device 16 including the continuously-variable transmission portion 20 and the step-variable transmission portion 22 is constructed substantially symmetrically about its axis corresponding to the above-described common axis, so that a lower half of the drive-force transmitting device 16 is not shown in FIG. 1. The above-described common axis corresponds to axes of a crank shaft of the engine 12 and a connecting shaft 34 that is described below.

The continuously-variable transmission portion 20 is provided with: a first rotating machine (first motor/generator) MG1; a differential mechanism 32 serving as a drive-force distributing device to mechanically distribute the drive force of the engine 12 to the first rotating machine MG1 and to an intermediate transmitting member 30 that is an output rotary member of the continuously-variable transmission portion 20; and a second rotating machine (second motor/generator) MG2 connected to the intermediate transmitting member 30 in a drive-force transmittable manner. The continuously-variable transmission portion 20 is an electrically-controlled continuously-variable transmission wherein a differential state of the differential mechanism 32 is controllable by controlling an operation state of the first rotating machine MG1. The first rotating machine MG1 serves as a differential rotating machine capable of controlling an engine rotational speed Ne that is a rotational speed of the engine 12. The second rotating machine MG2 serves as a vehicle-driving rotating machine, i.e., a drive force source capable of generating a drive torque driving the vehicle 10. The vehicle 10 is a hybrid vehicle provided with the drive force sources in the form of the engine 12 and the second rotating machine MG2. The drive force of each of the drive forces is to be transmitted to the drive wheels 14 through the drive-force transmitting device 16. It is noted that an operation of the first rotating machine MG1 is controlled by controlling an operation state of the first rotating machine MG1.

The differential mechanism 32 is a planetary gear device of a single-pinion type having a sun gear S0, a carrier CA0 and a ring gear R0. The carrier CA0 is connected to the engine 12 through a connecting shaft 34 in a drive-force transmittable manner, and the sun gear S0 is connected to the first rotating machine MG1 in a drive-force transmittable manner, while the ring gear R0 is connected to the second rotating machine MG2 in a drive-force transmittable manner. In the differential mechanism 32, the carrier CA0 serves as an input rotary element, and the sun gear S0 serves as a reaction rotary element, while the ring gear R0 serves as an output rotary element.

The step-variable transmission portion 22 is a mechanically-operated transmission mechanism which constitutes a part of a drive-force transmitting path between the intermediate transmitting member 30 and the drive wheels 14, namely, constitutes a part of a drive-force transmitting path between the continuously-variable transmission portion 20 and the drive wheels 14. The intermediate transmitting member 30 also serves as an input rotary member of the step-variable transmission portion 22. The step-variable transmission portion 22 is considered to also as a vehicle transmission constituting a part of a drive-force transmitting path between the drive force source (second rotating machine MG2 or engine 12) and the drive wheels 14, since the second rotating machine MG2 is connected to the intermediate transmitting member 30 such that the intermediate transmitting member 30 is rotated together with the second rotating machine MG2, or since the engine 12 is connected to an input rotary member of the continuously-variable transmission portion 20. The intermediate transmitting member 30 is a transmitting member through which the drive force of the drive force source is to be transmitted to the drive wheels 14. The step-variable transmission portion 22 is a known automatic transmission of a planetary gear type which is provided with a plurality of planetary gear devices in the form of a first planetary gear device 36 and a second planetary gear device 38, and a plurality of engagement devices including a clutch C1, a clutch C2, a brake B1 and a brake B2. Hereinafter, the clutch C1, clutch C2, brake B1 and brake B2 will be referred to as engagement devices CB unless otherwise specified.

Each of the engagement devices CB is a hydraulically operated frictional engagement device in the form of a multiple-disc type or a single-disc type clutch or brake that is to be pressed by a hydraulic actuator, or a band brake that is to be tightened by a hydraulic actuator. The engagement devices CB are selectively placed in engaged, slipped or released states as the operation states with hydraulic pressures Pc1, Pc2, Pb1, Ph2 (see FIG. 4) as regulated pressures supplied from a hydraulic control unit (hydraulic control circuit) 56 provided in the vehicle 10. Thus, the hydraulic pressures Pc1, Pc2, Pb1, Pb2 are hydraulic pressures supplied to the step-variable transmission portion 22.

In the step-variable transmission portion 22, selected ones of rotary elements of the first and second planetary gear devices 36 and 38 are connected to each other or to the intermediate transmitting member 30, casing 18 or output shaft 24, either directly or indirectly (selectively) through the engagement devices CB or a one-way clutch F1. The rotary elements of the first planetary gear device 36 are a sun gear S1, a carrier CA1 and a ring gear R1. The rotary elements of the second planetary gear device 38 are a sun gear S2, a carrier CA2 and a ring gear R2.

The step-variable transmission portion 22 is shifted to a selected one of four AT gear positions (speed positions) by engaging actions of selected ones of the engagement devices CB. These four AT gear positions have respective different gear ratios (speed ratios) γat (=AT input rotational speed Ni/AT output rotational speed No). Namely, the step-variable transmission portion 22 is shifted up and down from one gear position to another by placing selected ones of the engagement devices in the engaged state. The step-variable transmission portion 22 is a step-variable automatic transmission configured to establish a selected one a plurality of gear positions. In the following description of the present embodiment, the gear position established in the step-variable transmission portion 22 will be referred to as AT gear position. The AU input rotational speed Ni is an input rotational speed of the step-variable transmission portion 22 that is a rotational speed of the input rotary member of the step-variable transmission portion 22, which is equal to a rotational speed of the intermediate transmitting member 30, and which is equal to an MG2 rotational speed Nm that is an rotational speed of the second rotating machine MG2. Thus, the AT input rotational speed Ni can be represented by the MG2 rotational speed Nm. The AT output rotational speed No is a rotational speed of the output shaft 24 that is an output rotational speed of the step-variable transmission portion 22, which is considered to be an output speed of a transmission device (composite transmission) 40 which consists of the continuously-variable transmission portion 20 and the step-variable transmission portion 22. The transmission device 40 is a transmission that constitutes a part of a drive-force transmitting path between the engine 12 and the drive wheels 14.

Figures 2, 3:
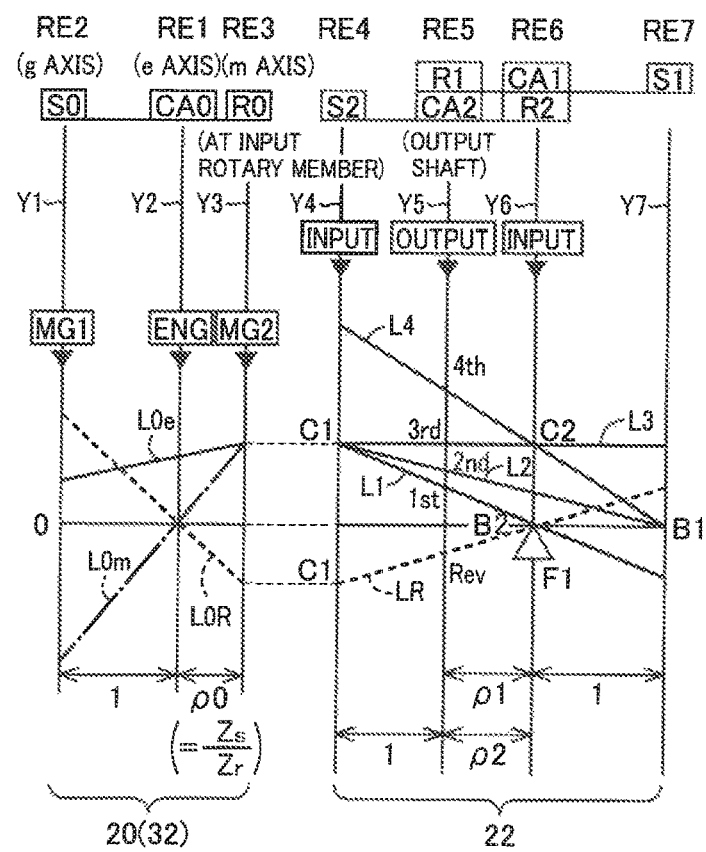
FIG. 2 is a table indicating a relationship between each gear position of a mechanically-operated step-variable transmission portion and a combination of hydraulically-operated engagement devices of the step-variable transmission portion, which are placed in engaged states to establish the gear position in the vehicle of FIG. 1.
FIG. 3 is a collinear chart indicating a relationship among rotational speeds of rotary elements of an electrically-operated continuously-variable transmission portion and the mechanically-operated step-variable transmission portion.

Reference is now made to FIG. 2, which is the table indicating the relationship between the first through fourth speed AT gear positions of the step-variable transmission portion 22 shown in FIG. 1 and combinations of the engagement devices CB placed in the engaged states to establish the respective AT gear positions. In the table, the four forward AT gear positions are respectively represented by "1st", "2nd", "3rd" and "4th". The first speed AT gear position "1st" is the lowest-speed gear position having a highest gear ratio γat, while the fourth speed AT gear position "4th" is the highest-speed gear position having a lowest gear ratio γat. The gear ratio γat decreases in the direction from the first speed AT gear position (lowest-speed gear position) "1st" toward the fourth speed AT gear position (highest-speed gear position) "4th". In the table, "O" indicates the engaged state of the engagement devices CB, "Δ" indicates the engaged state of the brake B2 during application of an engine brake to the vehicle 10 or during a coasting shift-down action of the step-variable transmission portion 22, and the blank indicates the released state of the engagement devices CB.

The step-variable transmission portion 22 is configured to switch from one of the AT gear positions to another one of the AT gear positions, namely, to establish one of the AT gear positions which is selected, by the electronic control apparatus 90, according to, for example, an acceleration operation made by a vehicle driver (operator) and the vehicle running speed V. The step-variable transmission portion 22 is shifted up or down from one of the AT gear positions to another, for example, by so-called "clutch-to-clutch" shifting operation that is made by releasing and engaging actions of the selected two engagement devices CB, namely, by a releasing action of one of the engagement devices CB and an engaging action of another one of the engagement devices CB. In the following description of the present embodiment, a shift down action from the second speed AT gear position "2nd" to the first speed AT gear position "1st" will be referred to as shift down action from 2nd to 1st. The other shift down and up actions will be referred in the same way.

The vehicle 10 further includes an MOP 58 that is a mechanically-operated oil pump, an FOP 60 that is an electrically-operated oil pump, an air conditioner 62 and an audio device 64.

The MOP 58 is connected to the connecting shaft 34, and is to be rotated together with rotation of the engine 12, so as to output a working fluid oil that is to be used in the drive-force transmitting device 16. The EOP 60 is to be orated by a motor 66 which is provided in the vehicle 10 and which serves exclusively for the EOP 60, so as to output the working fluid oil. The working fluid oil outputted by the MOP 58 and the EOP 60 is supplied to the hydraulic control unit 56 (see FIG. 4). The operation states of the engagement devices CB are controlled by hydraulic pressures Pc1, Pc2, Pb1, Pb2 that are regulated pressures to which the working fluid oil are regulated by the hydraulic control unit 56. The air conditioner 62 includes a compressor 68 that is connected to the engine 12 through, for example, a belt and an electromagnetic clutch (not shown), and is configured to adjust temperature in an interior of the vehicle 10. The audio device 64 is configured to record, play, emit sound in the interior of the vehicle 10, and includes a radio for receiving a sound source, FIG. 3 is a collinear chart representative of a relative relationship of rotational speeds of the rotary elements in the continuously-variable transmission portion 20 and the step-variable transmission portion 22. In FIG. 3, three vertical lines Y1, Y2, Y3 corresponding to the three rotary elements of the differential mechanism 32 constituting the continuously-variable transmission portion 20 are a g-axis representative of the rotational speed of the sun gear S0 corresponding to a second rotary element RE2, an e-axis representative of the rotational speed of the carrier CA0 corresponding to a first rotary element RE1, and an maxis representative of the rotational speed of the ring gear R0 corresponding to a third rotary element RE3 (i.e., the input rotational speed of the step-variable transmission portion 22) in order from the left side. Four vertical lines Y4, Y5, Y6, Y7 of the step-variable transmission portion 22 are axes respectively representative of the rotational speed of the sun gear S2 corresponding to a fourth rotary element RE4, the rotational speed of the ring gear R1 and the carrier CA2 connected to each other and corresponding to a fifth rotary element RE5 (i.e., the rotational speed of the output shaft 24), the rotational speed of the carrier CA1 and the ring gear R2 connected to each other and corresponding to a sixth rotary element RE6, and the rotational speed of the sun gear S1 corresponding to a seventh rotary element RE7 in order from the left. An interval between the vertical lines Y1, Y2, Y3 is determined in accordance with a gear ratio ρ0 of the differential mechanism 32. An interval between the vertical lines Y4, Y5, Y6, Y7 is determined in accordance with gear ratios ρ1, ρ2 of the first and second planetary gear devices 36, 38. When an interval between the sun gear and the carrier is set to an interval corresponding to "1" in the relationship between the vertical axes of the collinear chart, an interval corresponding to the gear ratio ρ (=the number Zs of teeth of the sun gear the number Zr of teeth of the ring gear) of the planetary gear device is set between the carrier and the ring gear.

In representation using the collinear chart of FIG. 3, in the differential mechanism 32 of the continuously variable transmission portion 20, the engine 12 (see. "ENG" in FIG. 3) is connected to the first rotary element RE1; the first rotating machine MG1 (see "MG1" in FIG. 3) is connected to the second rotary element RE2; the second rotating machine MG2 (see "MG2" in FIG. 3) is connected to the third rotary element RE3 that is to be rotated integrally with the intermediate transmitting member 30; and therefore, the rotation of the engine 12 is transmitted via the intermediate transmitting member 30 to the step-variable transmission portion 22. In the continuously-variable transmission portion 20, the relationship between the rotational speed of the sun gear S0 and the rotational speed of the ring gear R0 is indicated by straight lines L0e, L0m and L0R crossing the vertical line Y2.

In the step-variable transmission portion. 22, the fourth rotary element RE4 is selectively connected through the clutch C1 to the intermediate transmitting member 30; the fifth rotary element RE5 is connected to the output shaft 24; the sixth rotary element RE6 is selectively connected through the clutch C2 to the intermediate transmitting member 30 and selectively connected through the brake B2 to the casing 18; and the seventh rotary element RE7 is selectively connected through the brake B1 to the casing 18. In the step-variable transmission portion 22, the rotational speeds of "1st", "2nd", "3rd.", "4th", and "Rev" of the output shaft 24 are indicated by respective straight lines L1, L2, L3, L4, LR crossing the vertical line Y5 in accordance with engagement/release control of the engagement devices CB.

The straight line L0e and the straight lines L1, L2, L3, L4 indicated by solid lines in FIG. 3 indicate the relative speeds of the rotary elements during forward running in a hybrid running mode enabling a hybrid running in which at least the engine 12 is used as the drive force source for driving the vehicle 10. In this hybrid running mode, when a reaction torque, i.e., a negative torque from the first rotating machine MG1, is inputted in positive rotation to the sun gear S0 with respect to the engine torque Te inputted to the carrier CA0 in the differential mechanism 32, an engine direct transmission torque Td [$=Te/(1+\rho 0)=-(1/\rho 0)\times Tg$] appears in the ring gear R0 as a positive torque in positive rotation. A combined torque of the engine direct transmission torque Td and the MG2 torque Tm is transmitted as the drive, torque of the vehicle 10 in the forward direction depending on a required drive force to the drive wheels 14 through the step-variable transmission portion 22 having any AT gear position formed out of the AT first to AT fourth gear positions. In this case, the first rotating machine MG1 functions as an electric generator generating a negative torque in positive rotation. A generated electric power Wg of the first rotating machine MG1 is stored in the battery 54 or consumed by the second rotating machine MG2. The second rotating machine MG2 outputs the MG2 torque Tm by using all or a part of the generated electric power Wg or using the electric power from the battery 54 in addition to the generated electric power Wg.

A straight line L0m indicated by a dashed-dotted line in FIG. 3 and straight lines L1, L2, L3, and L4 indicated by solid lines in FIG. 3 indicate the relative speeds of the respective rotary elements during forward running in a motor running mode enabling a motor running in which the second rotating machine MG2 is used as the drive force source for driving the vehicle 10 with the engine 12 being stopped. During the forward running in the motor running mode, the carrier CA0 is set to zero rotation and the MG2 torque Tin is inputted to the ring gear R0 as a positive torque in positive rotation. In this case, the first rotating machine MG1 connected to the sun gear S0 is brought into a non-load state and is idled in negative rotation. That is, during the forward running in the motor running mode, the engine 12 is not driven so that the engine rotational speed Ne is made zero, and the MG2 torque Tm is transmitted as the drive torque of the vehicle 10 in the forward direction to the drive wheels 14 through the step-variable transmission portion 22 in which one of the AT first to AT fourth gear positions is established. During the forward running in the motor running mode, the MG2 torque Tm is a power running torque that is a positive torque in positive rotation.

The straight lines L0R and LR indicated by broken lines in FIG. 3 indicate the relative speeds of the rotary elements in reverse running in the motor running mode. During reverse running in this motor running mode, the MG2 torque Tm is inputted to the ring gear R0 as a negative torque in negative rotation, and the MG2 torque Tm is transmitted as the drive torque of the vehicle 10 in a reverse direction to the drive wheels 14 through the step-variable transmission portion 22 in which the AT first gear position is established. The vehicle 10 can perform the reverse running when the electronic control apparatus 90 causes the second rotating machine MG2 to output a reverse MG2 torque Tm having a positive/negative sign opposite to a forward MG2 torque Tm during forward running while a forward low-side AT gear position, for example, the AT first gear position, is established as one of the plurality of AT gear positions. During the reverse running in the motor running mode, the MG2 torque Tm is a power running torque that is a negative torque in negative rotation. Even in the hybrid running mode, the reverse running can be performed as in the motor running mode since the second rotating machine MG2 can be rotated in negative direction as indicated by the straight line L0R.

In the drive-force transmitting device 16, the continuously-variable transmission portion 20 constitutes an electric transmission mechanism that includes the differential mechanism 32 having three rotary elements, wherein the three rotary elements consist of the first rotary element RE1 in the form of the carrier CA0 to which the engine 12 is connected in a drive-force transmittable manner, the second rotary element RE2 in the form of the sun gear S0 to which the first rotating machine MG1 is Connected in a drive-force transmittable manner, and the third rotary element RE3 in the form of the ring gear R0 to which the intermediate transmitting member 30 is connected, and wherein the differential state of the differential mechanism 32 is controlled by controlling the operation state of the first rotating machine From another viewpoint, the third rotary element. RE3 having the intermediate transmitting member 30 connected thereto is the third rotary element RE3 to which the second rotating machine MG2 is connected in a drive-force transmittable manner. That is, in the drive-force transmitting device 16, the continuously-variable transmission portion 20 has the differential mechanism 32 to which the engine 12 is connected in a drive-force transmittable manner and the first rotating machine MG1 connected to the differential mechanism 32 in a drive-force transmittable manner, such that the differential state of the differential mechanism 32 is controlled by controlling the operation state of the first rotating machine MG1. The continuously-variable transmission portion 20 is operated as an electric continuously variable transmission driven to change a gear ratio $\gamma 0$ (=Ne/Nm) that is a ratio of the engine rotational speed Ne to the MG2 rotational speed Nm, wherein the engine rotational speed Ne is equal to the rotational speed of the connecting shaft 34 serving as an input rotary member of the continuously-variable transmission portion 20 while the MG2 rotational speed Nm is equal to the rotational speed of the intermediate transmitting member 30 serving as an output rotating member of the continuously-variable transmission portion 20.

For example, in the hybrid running mode, when the rotational speed of the sun gear S0 is increased or reduced by controlling the rotational speed of the first rotating machine MG1 relative to the rotational speed of the ring gear R0 that is restrained by the rotation of the drive wheels 14 since one of the AT gear positions is established in the step-variable transmission portion 22, the rotational speed of the carrier CA0, i.e., the engine rotational speed Ne, is increased or reduced, Therefore, in the hybrid running, the engine 12 can be operated at an efficient operating point. Thus, a continuously variable transmission can be constituted by cooperation of the step-variable transmission portion 22 having one of the AT gear position is established therein and the continuously-variable transmission portion 20 operated as a continuously variable transmission, as the whole of the transmission device 40 in which the continuously-variable transmission portion 20 and the step-variable transmission portion 22 are arranged in series.

Alternatively, since a shifting operation can be performed in the continuously-variable transmission portion 20 as in a step-variable transmission, a shifting operation can be performed as in a step-variable transmission by using the step-variable transmission portion 22 having one of the AT gear positions established therein and the continuously-variable transmission portion 20 in which a shifting operation is performed as in a step-variable transmission, as the whole of the transmission device 40. In other words, in the transmission device 40, the step-variable transmission portion 22 and the continuously-variable transmission portion 20 can be controlled so as to selectively establish a plurality of gear positions that are different in the gear ratio $\gamma t$ (=Ne/No) indicative of the ratio of the engine rotational speed Ne to the output rotational speed No. In the present embodiment, the gear position established in the transmission device 40 is referred to as an overall speed position (although it may be referred also to as a conceptual speed position). The gear ratio $\gamma t$ is an overall gear ratio of the transmission device 40 consisting of the continuously-variable transmission portion 20 and the step-variable transmission portion 22 which are disposed in series with each other. The overall gear ratio $\gamma t$ is equal to a product of the gear ratio $\gamma 0$ of the continuously-variable transmission portion 20 and the gear ratio $\gamma at$ of the step-variable transmission portion 22, namely, $\gamma t=\gamma 0\times\gamma at$.

For example, the overall speed position is assigned such that one or more types are established for each of the AT gear positions of the step-variable transmission portion 22 by combining the AT gear positions of the step-variable transmission portion 22 with one or more types of the gear ratio $\gamma 0$ of the continuously-variable transmission portion 20. For example, the overall speed position is defined in advance such that first through third overall speed positions are established for the first speed AT gear position, the fourth through sixth overall speed positions are established for the second speed AT gear position, seventh through ninth overall speed positions are established for the third speed AT gear position, and the tenth overall speed position is established for the fourth speed AT gear position. In the transmission device 40, the continuously-variable transmission portion 20 is controlled to attain the engine rotational speed Ne by which a desired gear ratio $\gamma t$ is established for the output rotational speed No, so that different speed positions are established with a certain AT gear position being established in the step-variable transmission portion 22. Further, in the transmission device 40, the continuously-variable transmission portion 20 is controlled with switching of the AT gear position in the step-variable transmission portion 22 whereby the overall speed position is switched.

Referring back to FIG. 1, the vehicle 10 is provided with the electronic control apparatus 90 as a controller including the control apparatus which is constructed according to present invention and which is configured to control, for example, the engine 12, continuously-variable transmission portion 20 and step-variable transmission portion 22. FIG. 1 is a view showing an input/output system of the electronic control apparatus 90, and is a functional block diagram for explaining major control functions and control portions if the electronic control apparatus 90. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne which is a rotational speed of the engine 12; an output signal of an output speed sensor 72 indicative of an output-shaft rotational speed No which is a rotational speed of the output shaft 24 and which corresponds to the running speed V of the vehicle 10; an output signal of a MG1 speed sensor 74 indicative of an MG1 rotational speed Ng Which is a rotational speed of the first rotating machine MG1; an output signal of a MG2 speed sensor 76 indicative of an MG2 rotational speed Nm which corresponds to an AT input rotational speed Ni; an output signal of an accelerator-operation amount sensor 78 indicative of an operation amount θacc of an accelerator member which represents an amount of accelerating operation made by the vehicle operator; an output signal of a throttle-opening degree sensor 80 indicative of the throttle opening degree θth; an output signal of a battery sensor 82 indicative of a battery temperature THba, a charging/discharging electric current Ibat and a voltage Vbat of the battery 54; an output signal of a fluid temperature sensor 84 indicative of a working fluid temperature THoil that is a temperature of a working fluid oil; an output signal of an air conditioner switch 86 indicative of an operation state ACon of the air conditioner switch 86 by which the air conditioner 62 is to be selectively activated and inactivated; an output signal of an audio switch 87 indicative of an operation state AUDon of the audio switch 87 by which the audio device 64 is to be selectively activated and inactivated; and an output signal of a shift position sensor 88 indicative of an operation position POSsh of a manually-operated shifting device in the form of a shift lever 89 provided in the vehicle 10. The electronic control apparatus 90 is configured to calculate a charged state value (stored electric power amount) SOC [%] as a value representing a charged state of the battery 54, for example, on the basis of the charging/discharging electric current That and the voltage Vbat of the battery 54.

The electronic control apparatus 90 generates various output signals to the various devices provided in the vehicle 10, such as: an engine control command signal Se that is to be applied to the engine control device 50 for controlling the engine 12, rotating-machine control command signals Sing that is to be applied to the inverter 52 for controlling the first and second rotating machines MG1, MG2; hydraulic control command signal Sat to be applied to the hydraulic control unit 56 for controlling the operation states of the engagement devices CB; an audio control command signal Saud that is to be applied to the audio device 64 for activating the audio device 64; an EOP control command signal Seop that is to be applied to the EOP 60 for controlling operation of the EOP 60; and an air-conditioner control command signal Sac that is to be applied to the compressor 68 for activating the air conditioner 62. The hydraulic control command signal Sat serve also as hydraulic control command signals for controlling shifting actions of the step-variable transmission portion 22.

Figure 4:
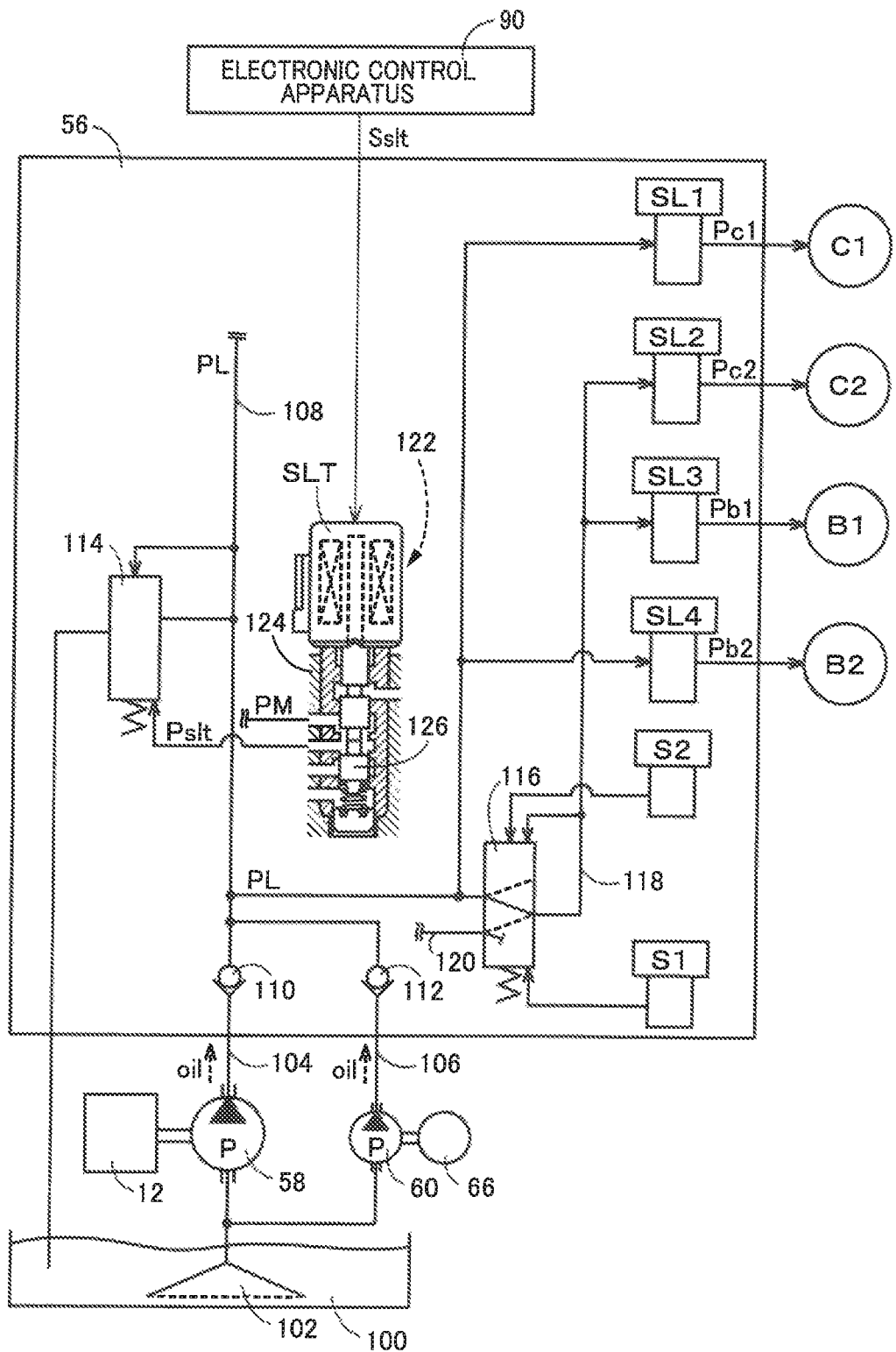
FIG. 4 is a view for explaining a hydraulic control unit and a hydraulic source that is configured to supply a working fluid to the hydraulic control unit.

FIG. 4 is a view for explaining the hydraulic control unit 56 and a hydraulic source that is configured to supply the working fluid oil to the hydraulic control unit 56, As shown in FIG. 4, the MOP 58 and the EOP 60 are provided in parallel with each other in a hydraulic circuit in which the working fluid oil is caused to flow. The MOP 58 and FOP 60 are configured to output the working fluid oil serving as original hydraulic pressures for switching an operation state of each of the engagement devices CB and as lubricant fluids for lubricating various parts of the drive-force transmitting device 16. The MOP 58 and FOP 60 pump up the working fluid oil returned into an oil pan 100 that is disposed in a lower portion of the casing 18, through a strainer 102 as an inlet port that is common to the MOP 58 and EOP 60, and supply the working fluid oil to respective fluid delivery passages 104, 106. The fluid delivery passages 104, 106 are connected to a fluid passage of the hydraulic control unit 56, for example, connected to a line-pressure fluid passage 108 through which a line pressure PL is caused to flow. The fluid delivery passage 104, to which the working fluid oil is to be supplied from the MOP 58, is connected to the line-pressure fluid passage 108 through an MOP check valve 110 that is provided in the hydraulic control unit 56. The fluid delivery passage 106, to which the working fluid oil is to be supplied from the EOP 60, is connected to the line-pressure fluid passage 1.08 through a EOP check valve 112 that is provided in the hydraulic control unit 56. The MOP 58 outputs the working fluid oil by being rotated together with rotation of the engine 12. The EOP 60 is capable of outputting the working fluid oil, irrespective whether the engine 12 is rotated or not. The FOP 60 outputs the working fluid oil with the motor 66 being operated by the electronic control apparatus 90, for example, when the vehicle 10 runs in the motor running mode.

The hydraulic control unit 56 includes, in addition to the above-described line-pressure fluid passage 108, MOP check valve 110 and EOP check valve 112, a regulator valve 114, a switch valve 116, a fluid supply passage 118, a fluid discharge passage 120 and solenoid valves SLT, S1, S2, SL1-SL4.

The regulator valve 114 regulates the line pressure PL that is the working fluid oil supplied from at least one of the MOP 58 and EOP 60. The solenoid valve SLT, which is a linear solenoid valve, for example, is controlled by the electronic control apparatus 90, so as to supply, to the regulator valve 114, a pilot pressure Pslt that is dependent on, for example, the input torque applied to the step-variable transmission portion 22, whereby the line pressure PL is controlled to a pressure value dependent on, for example, the input torque applied to the step-variable transmission portion 22. The solenoid valve SLT is configured to receive an original pressure in the form of a modulator pressure PM having a certain pressure value, for example, to which the line pressure PL as an original pressure is regulated by a modulator valve (not shown).

The switch valve 116 is configured to establish one of fluid passages that is selected based on the hydraulic pressures supplied from the solenoid valves S1, S2. Each of the solenoid valves S1, S2 is, for example, an ON-OFF solenoid valve, and is controlled by the electronic control apparatus 90, so as to supply the hydraulic pressure to the switch valve 116. When the hydraulic pressure is supplied from the solenoid valve S2 without the hydraulic pressure being supplied from the solenoid valve S1, the switch valve 116 establishes a fluid passage that connects between the line-pressure fluid passage 108 and the fluid supply passage 118. When the hydraulic pressures are supplied from both of the solenoid Valve S1 and the solenoid valve S2 or supplied from neither the solenoid valve S1 nor the solenoid valve S2, or when the hydraulic pressure is supplied from the solenoid valve S1 without the hydraulic pressure being supplied from the solenoid valve S2, the switch valve 116 establishes a fluid passage that connects between the fluid discharge passage 120 and the fluid supply passage 118 while blocking the fluid passage between the line-pressure fluid passage 108 and the fluid supply passage 118. The fluid supply passage 118 is a fluid passage through which the hydraulic pressure inputted to each of the solenoid valves SL2, SL3 is caused to flow. The fluid discharge passage 120 is an atmosphere-opening passage through which the working fluid oil is discharged from the hydraulic control unit 56 toward outside the hydraulic control unit 56, namely, through which the working fluid oil is returned to the oil pan 100, When the operation position POSsh of the shift lever 89 is a D position selecting a forward running position of the transmission device 40 that enables a forward running of the vehicle 10, for example, the electronic control apparatus 90 supplies, to the hydraulic control unit 56, the hydraulic control command signal Sat which causes the solenoid valve S2 to output the hydraulic pressure and which causes the solenoid valve S1 not to output the hydraulic pressure. When the operation position POSsh of the shift lever 89 is a R position selecting a reverse running position of the transmission device 40 that enables a reverse running of the vehicle 10, for example, the electronic control apparatus 90 supplies, to the hydraulic control unit 56, the hydraulic control command signal Sat which causes the solenoid valves S1, S2 to output the hydraulic pressures.

Each of the solenoid valves SL1-SL4 is, for example, a linear solenoid valve that is controlled by the electronic control apparatus 90, so as to output a corresponding one of the hydraulic pressures Pc1, Pc2, Pb1, Pb2 to a corresponding one of the engagement devices CB. The solenoid valve SL1 receives the line pressure PL as the original pressure and regulates the hydraulic pressure Pc1 that is supplied to a hydraulic actuator of the clutch C1. The solenoid valve SL2 receives the line pressure PL as the original pressure through the switch valve 116 and regulates the hydraulic pressure Pc2 that is supplied to a hydraulic actuator of the clutch C2. The solenoid valve SL3 receives the line pressure PL as the original pressure through the switch valve 116 and regulates the hydraulic pressure Pb1 that is supplied to a hydraulic actuator of the brake B1. The solenoid valve SL4 receives the line pressure PL as the original pressure and regulates the hydraulic pressure Pb2 that is supplied to a hydraulic actuator of the brake 132.

As described above, since the line pressure FL is the original pressure of each of the hydraulic pressures Pc1, Pc2, Pb1, Pb2 that are supplied to the respective engagement devices CB, the line pressure PL is a pressurized working fluid that is involved to control or switch the operation state of each of the engagement devices CB. The solenoid valve SLT is a linear solenoid valve configured to regulate the line pressure PL. Therefore, the line pressure PL is also interpreted as the hydraulic pressure in the step-variable transmission portion 22. Each of the solenoid valves SL1-SL4 and solenoid valve SLT is a linear solenoid valve configured to regulate the hydraulic pressure in the step-variable transmission portion 22. The electronic control apparatus 90 is a control apparatus for these linear solenoid valves.

Referring back to FIG. 1, for performing various control operations in the vehicle 10, the electronic control apparatus 90 includes a hydraulic control means or portion in the form of a hydraulic control portion 92 and a hybrid control means or portion in the form of a hybrid control portion 94.

The hydraulic control portion 92 sets pressure command values of hydraulic pressures Pc1, Pc2, Pb1, Pb2 supplied to the respective engagement devices CB, and supplies, to the hydraulic control unit 56, the hydraulic control command signal Sat including the pressure command values of the hydraulic pressures Pc1 Pc2, Pb1, Pb2. The hydraulic control command signal Sat is a control command signal by which the solenoid valves SL1-SL4 are operated to regulate the hydraulic pressures Pc1, Pc2, Pb1, Pb2.

The hydraulic control portion 92 supplies, to the hydraulic control unit 56, the hydraulic control command signal Sat by which the solenoid valve SLT is operated to regulate the line pressure PL to a regulated pressure value dependent on the vehicle driving state that is represented by, for example, the input torque inputted to the step-variable transmission portion 22. The hydraulic control command signal Sat for operating or driving the solenoid valve SLT is a control command signal Sslt that is to be applied to a solenoid 122 of the solenoid valve SLT (see FIG. 4). The control command signal Sslt is, for example, a drive pulse signal which is applied to a coil of the solenoid 122 and which is subjected to a PWM (pulse width modulation) control. Thus, the drive pulse signal having a drive signal frequency Fre is applied to the coil of the solenoid 122 the following description of the present embodiment, the control command signal Sslt, by which the line pressure PL is to be regulated to a regulated pressure value that is dependent on the input torque inputted to the step-variable transmission portion 22, will be referred to as a regulating control command signal Ssltc. The regulating control command signal Ssltc is a drive pulse signal having a regulating drive-signal frequency Free as a normal drive-signal frequency Fre and establishing a regulating electric current value Isltc. The regulating electric current value Isltc is a normal value of a control electric current value Islt, and causes the solenoid valve SLT to output the pilot pressure Pslt by which the line pressure PL is regulated to the regulated pressure value suitable for the input torque inputted to the step-variable transmission portion 22. The control electric current value Islt may be interpreted to mean an average value of a control electric current that is generated or constituted by the control command signal Sslt.

Figure 5:
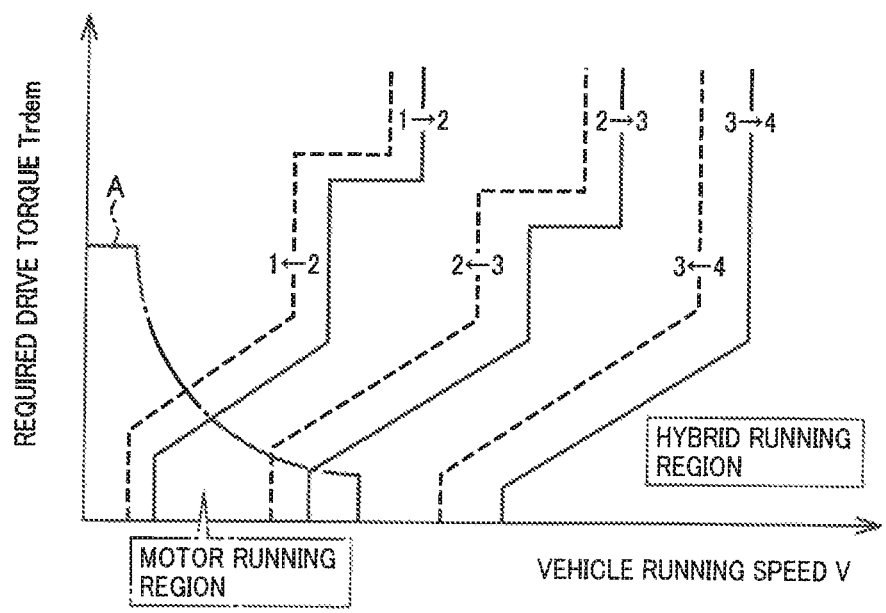
FIG. 5 is a view showing, by way of examples, a shifting map used for controlling gear shifting in the step-variable transmission portion, a drive-force-source switching map used for switching between a hybrid running and a motor running, and a relationship between the shifting map and the drive-force-source switching map.

The hydraulic control portion 92 includes an AT shift control means, i.e., an AT shift control portion configured to control shifting actions executed in the step-variable transmission portion 22. Specifically, the hydraulic control portion 92 is configured to determine a shifting action of the step-variable transmission portion 22, by using, for example, an AT gear position shift map as shown in FIG. 5, which is a relationship obtained by experimentation or determined by an appropriate design theory, and causes a shifting action to be executed in the shift control of the step-variable transmission portion 22 as needed. In the control of the shifting actions in the step-variable transmission portion 22, the hydraulic control portion 92 supplies, to the hydraulic control unit 56, the hydraulic control command signal Sat for switching the operation states (engaged/released states) of the engagement devices CB by the solenoid valves SL1 to SL4 so as to automatically switch the AT gear position of the step-variable transmission portion 22. The AT gear position shifting map is a predetermined relationship between two variables in the form of the vehicle running speed V and a required drive torque Trdem, for example, which relationship is used to determine a shifting action of the step-variable transmission portion 22 and is represented by shifting lines in a two-dimensional coordinate system in Which the running speed V and the required drive torque Trdem are taken along respective two axes. It is noted that one of the two variables may be the output rotational speed No in place of the running speed V and the other of the two variables may be the required drive force Frdem, accelerator opening degree θacc or throttle valve opening degree θth in place of the required drive torque Trdem. The shifting lines in the AT gear position shifting map consist of shift-up lines (indicated by solid lines in FIG. 5) for determining a shift-up action of the step-variable transmission portion 22, and shift-down lines (indicated by broken lines in FIG. 5) for determining a shift-down action of the step-variable transmission portion 22.

The hybrid control portion 94 has a function of an engine control means or portion for controlling the operation of the engine 12 and a function of a rotating machine control means or portion for controlling the operations of the first rotating machine MG1 and the second rotating machine MG2 via the inverter 52, and provides a hybrid drive control using the engine 12, the first rotating machine MG1 and the second rotating machine MG2 through these control functions. The hybrid control portion 94 calculates the drive request amount in the form of the required drive torque Trdem [Nm] that is to be applied to the drive wheels 14, by applying the accelerator opening degree θacc and the vehicle speed V to, for example, a drive request amount map that is a predefined relationship. The required drive force Frdem [N] applied to the drive wheels 14, a required drive power Prdem [W] applied to the drive wheels 14, a required AT output torque applied to the output shaft 24, etc. can be used as the drive request amount, in addition to the required drive torque Trdem. The hybrid control portion 94 outputs the engine control command signal Se that is a command signal for controlling the engine 12 and the rotating machine control command signal Snag that is a command signal for controlling the first rotating machine MG1 and the second rotating machine MG2 so as to achieve the required drive power Prdem, for example.

For example, when the transmission device 40 is operated as a continuously variable transmission as a whole by operating the continuously variable transmission portion 20 as a continuously variable transmission, the hybrid control portion 94 controls the engine 12 and controls the generated electric power Wg of the first rotating machine MG1 so as to attain the engine rotational speed Ne and the engine torque Te at which the engine power Pe achieving the required drive power Prdem is acquired in consideration of an engine optimum fuel consumption point etc., and thereby provides the continuously variable shift control of the continuously variable transmission portion 20 to change the gear ratio γ0 of the continuously variable transmission portion 20. As a result of this control, the gear ratio γt of the transmission device 40 is controlled in the case of operating the transmission device 40 as a continuously variable transmission.

For example, when the transmission device 40 is operated as a step-variable transmission as a whole by operating the continuously variable transmission portion 20 as in a step-variable transmission, the hybrid control portion 94 uses a predetermined relationship, for example, an overall speed position shift map, to determine a shifting action of the transmission device 40 and provides the shift control of the continuously variable transmission portion 20 so as to selectively establish the plurality of overall speed positions in coordination with the shift control of the AT gear position of the step-variable transmission portion 22 by the hydraulic control portion 92. The plurality of overall speed positions can be established by controlling the engine rotational speed Ne by the first rotating machine MG1 in accordance with the vehicle speed V so as to maintain the respective gear ratios γt. The gear ratio γt of each of the overall speed positions may not necessarily be a constant value over the entire region of the vehicle speed V and may be changed in a predetermined region or may be limited by an upper limit, a lower limit, etc. of the rotational speed of each rotary member or element. As described above, the hybrid control portion 94 can provide the shift control in which the engine rotational speed Ne is changed as in a step-variable shift. An overall step-variable shift control of causing the transmission device 40 to perform a shift as in a step-variable transmission as a whole may be provided only in priority to the continuously variable shift control of operating the transmission device 40 as a continuously variable transmission as a whole in the case that, for example, the vehicle operator selects a running mode placing emphasis on running performance such as a sports running mode etc. or the required drive torque Trdem is relatively large; however, the overall step-variable shift control may basically be provided except when a predetermined restriction is placed on provision.

The hybrid control portion 94 selectively establishes the motor running mode or the hybrid running mode as the running mode depending on a running state to cause the vehicle 10 to run in each of the running modes. For example, the hybrid control portion 94 establishes the motor running mode when the required drive power Prdem is in a motor running region smaller than a predefined threshold value, and establishes the hybrid running mode when the required drive power Prdem is in a hybrid running region equal to or greater than the predefined threshold value. Even when the required drive power Prdem is in the motor running region, the hybrid control portion 94 establishes the hybrid running mode if the state-of-charge value SOC of the battery 54 is less than a predefined engine start threshold value. The engine start threshold value is a predefined threshold value for determining that the state-of-charge value SOC reaches a level at which the engine 12 must forcibly be started for charging the battery 54. It is noted that the required drive power Prdem corresponds to a value obtained by multiplying the required drive torque Trdem with the running speed V.

FIG. 5, one-dot chain line A represents is a boundary line used to determine whether at least the engine 12 is to be operated as the drive force source for driving the vehicle 10 or whether only the second rotating machine MG2 is to be operated as the drive force source for driving the vehicle 10. That is, the one-dot chain line A serves as the boundary line between the hybrid running region and the motor running region for switching between the hybrid running and the motor running. A predetermined relationship having the boundary line as represented by the one-dot chain line A in FIG. 5 is an example of a drive-force-source switching map defined by two-dimensional coordinates using the vehicle speed V and the required drive torque Trdem as variables. This drive-force-source source switching map is a map predetermined together with the AT gear position shift map indicated by the solid lines and the broken lines in FIG. 5, for example.

In a pressure regulating state of the solenoid valve SL1 in which the solenoid valve SLT is filled with the working fluid oil so as to output the pilot pressure Pslt that is regulated based on the control command signal Sslt, there is a case in which the solenoid valve SLT is vibrated, for example, by pulsation of the pilot pressure Pslt, when a regulated pressure value of the pilot pressure Pslt regulated by the control command signal Sslt is in a certain pressure range. In this case, due to the vibration of the solenoid valve SLT, noise is likely to be caused by contact of a valve body 124 (see FIG. 4) of the hydraulic control unit 56 with the solenoid valve SLT that is received in the valve body 124. Therefore, in the pressure regulating state of the solenoid valve SLT, there is a need to restrain generation of the noise caused by the vibration of the solenoid valve SLT. In the following description, the noise caused by the vibration of the solenoid valve SLT will be referred to as vibration-based noise.

When the regulated pressure value of the line pressure PL, Which is dependent on the input torque inputted to the step-variable transmission portion 22, is in a certain pressure range Rpl in which the vibration-based noise is likely to be generated by vibration of the linear solenoid valve SLT that is operated with the regulating control command signal Ssltc being applied to the solenoid 122, the hydraulic control portion 92 is configured to output, as the control command signal Sslt, a noise-restraining command signal (Ssltr) by which generation of the vibration-based noise is restrained.

Specifically, for performing control function of restraining generation of the vibration-based noise due to the vibration of the solenoid valve SLT in the pressure regulating state of the solenoid valve SLT, the electronic control apparatus 90 further includes a state determining means or portion in the form of a state determining portion 96.

When the regulating control command signal Ssltc is applied to the solenoid 122 by the hydraulic control portion 92, the state determining portion 96 determines whether the regulated pressure value of the line pressure PL is in the certain pressure range Rpl or not, namely, whether the pilot pressure Pslt is in a noise-generation regulated pressure range Rslts. The noise-generation regulated pressure range Rslts is a predetermined range in which the nose is likely to be generated by vibration of the pilot pressure Pslt. That is, the noise-generation regulated pressure range Rslts is a certain pressure range of the pilot pressure Pslt by which the regulated pressure value of the line pressure PL dependent on the input torque inputted to the step-variable transmission portion 22 is caused to be in the certain pressure range Rpl.

When it is determined by the state determining portion 96 that the pilot pressure Pslt is in the noise-generation regulated pressure range Rslts, the control command signal Sslt is set, by the hydraulic control portion 92, to the noise-restraining command signal Ssltr in place of the regulating control command signal Ssltc. In the noise-restraining command signal Ssltr, the control electric current value Islt is set to a noise-restraining electric current value Isltr by which the line pressure PL is regulated outside the certain pressure range Rpl, namely, by which the pilot pressure Pslt is regulated outside the noise-generation regulated pressure range Rslts. Thus, when it is determined by the state determining portion 96 that the pilot pressure Pslt is in the noise-generation regulated pressure range Rslts, the hydraulic control portion 92 executes a first processing Mf for switching the control electric current value Islt of the control command signal Sslt from the regulating electric current value Isltc of the regulating control command signal Ssltc to the noise-restraining electric current value Islt of the noise-restraining command signal Ssltr. The noise-restraining electric current value Isltr is, for example, a predetermined value of the control electric current which restrains generation of the vibration-based noise resulting from the vibration of the solenoid valve SLT. On the other hand, when it is determined by the state determining portion 96 that the pilot pressure Pslt is not in the noise-generation regulated pressure range Rslts, the hydraulic control portion 92 maintains the regulating control command signal Ssltc as the control command signal Sslt.

FIG. 6 is a view fir showing a relationship between the control electric current value Islt and the pilot pressure Pslt in the solenoid valve SLT, and explaining, by way of example, a case in which the noise-restraining electric current value Isltr is used in place of the regulating electric current value Isltc. As shown in FIG. 6, the pilot pressure Pslt outputted from the solenoid valve SLT is maximized when the control electric current value Islt is zero [A]. In a case shown in FIG. 6, the pilot pressure Pslt is in the noise-generation regulated pressure range Rslts with application of the regulating control command signal Ssltc as the control command signal Sslt. That is, as indicated by black circle A, with application of the regulating electric current value site of the regulating control command signal Ssltc, the pilot pressure Pslt is in the noise-generation regulated pressure range Rslts. On the other hand, with execution of the first processing Mf, the control electric current value Islt is changed from the regulating electric current value Isltc to the noise-restraining electric current value Isltr whereby the pilot pressure Pslt is deviated from the noise-generation regulated pressure range Rslts, as indicated by black circle B, so that generation of the vibration-based noise is retrained. As indicated by black circle B relative to black circle A, with the execution of the first processing Mf, the pilot pressure Pslt is increased so that the line pressure PL is regulated to a pressure value that is higher than the regulated pressure value dependent on an actual input torque inputted to the step-variable transmission portion 22. Therefore, with the execution of the first processing Mf, the hydraulic pressures Pc1, Pc2, Pb1, Pb2 supplied to the engagement devices CB do not become insufficient.

When the first processing Mf is to be executed, the regulating drive-signal frequency Frec as the drive signal frequency Fre of the regulating control command signal Ssltc does not necessarily have to be changed. The regulating drive-signal frequency Free is, for example, a predetermined frequency value which restrains heat generation of switching elements provided to generate the drive pulse signals in the electronic control apparatus 90 and which stabilizes the pilot pressure Pslt. Where the drive signal frequency Fre is changed from the regulating drive-signal frequency Frec to the noise-restraining drive-signal frequency Frer, there is a possibility that the heat generation of the switching elements could be problematic. The noise-restraining drive-signal frequency Frer is, for example, a predetermined frequency value that restrains generation of the vibration-based noise caused by vibration of the solenoid valve SLT When it is determined by the state determining portion 96 that the pilot pressure Pslt is in the noise-generation regulated pressure range Rslts, hydraulic control portion 92 executes the first processing Mf while maintaining the regulating drive-signal frequency Frec as the drive signal frequency Fre of the control command signal Sslt.

Even if the vibration-based noise is generated due to vibration of the solenoid valve SLT, there is no need to execute the first processing Mf when a background noise in the interior of the vehicle 10 is so large that the vibration-based noise is not audible. When the control electric current value Islt is set to the noise-restraining electric current value Isltr with execution of the first processing Mf, the line pressure PL is regulated to a high pressure value, as described above, there is a possibility that an increase of load of a pump supplying the working fluid oil for the line pressure PL could be problematic. Since it is preferable that such an increase of the pump load is avoided as much as possible, it is preferable that the first processing Mf is executed exclusively when the background noise in the interior of the vehicle 10 is small.

The state determining portion 96 determines whether the vehicle 10 is in a small background-noise state, namely, whether the background noise in the interior of the vehicle 10 is in a vibration-based-noise audible level that is a predetermined level in which the vibration-based noise caused by vibration of the solenoid valve SIT is audible in the interior of the vehicle 10. Specifically, in a state in which the engine 12 is stopped, the running speed V is lower than a predetermined speed value V1, the air conditioner 62 is stopped (OFF) and any sound is not emitted from the audio device 64, the vehicle 10 is in the small background-noise state, namely, the background noise in the interior of the vehicle 10 is the small background-noise state in which the vibration-based noise is hardly absorbed in the background noise and is audible and distinguished from the background noise. The predetermined speed value V1 is a predetermined upper limit of a speed range in which it can be determined that the vehicle 10 is stopped or runs at a low speed so that the vehicle 10 is in the small background-noise state in which vibration-based noise is hardly absorbed in the background noise. The state in which any sound is not emitted from the audio device 64 is an audio OFF state that includes not only in a state in which the audio device 64 is stopped but also in a mute state in which the audio device 64 is muted during activation of the audio device 64. On the other hand, in a state in which the engine 12 is operated, the vehicle 10 is running with the running speed V being not lower than the predetermined speed value V1, the air conditioner 62 is operated or sound is emitted from the audio device 64, the background noise is so large that the vibration-based noise is absorbed in the background noise and is not audible to be distinguished from the background noise.

The state determining portion 96 determines whether the engine 12 is stopped or not, based on, for example, the engine control command signal Se. The state determining portion 96 determines whether the running speed V is lower than the predetermined speed value V1 or not. The state determining portion 96 determines whether the air conditioner 62 is stopped (OFF) or not, based on, for example, the operation state ACon of the air conditioner switch 86 or the air-conditioner control command signal Sac. The state determining portion 96 determines whether the audio device 64 is stopped (OFF) or not, based on, for example, the operation state AUDon of the audio switch 87 or the audio control command signal Saud. The state determining portion 96 determines that the vehicle 10 is in the small background-noise state, when determining that (i-1) the engine 12 is stopped, (ii-1) the running speed V is lower than the predetermined speed value V1, (iii-1) the air conditioner 62 is OFF and (iv-1) the audio device 64 is OFF. On the other hand, the state determining portion 96 determines that the vehicle 10 is not in the small background-noise state, when determining that (i-2) the engine 12 is not stopped, (ii-2) the running speed V is not lower than the predetermined speed value V1, (iii-2) the air conditioner 62 is not OFF or (iv-2) the audio device 64 is not OFF.

When it is determined by the state determining portion 96 that the vehicle 10 is in the small background-noise state and that the pilot pressure Pslt is in the noise-generation regulated pressure range Rslts, the hydraulic control portion 92 outputs, as the control command signal Sslt, the noise-restraining command signal Ssltr in place of the regulating control command signal Ssltc. On the other hand, when it is determined by the state determining portion 96 that the vehicle 10 is not in the small background-noise state, the hydraulic control portion 92 outputs the regulating control command signal Ssltc as the control command signal Sslt, irrespective whether it is determined by the state determining portion 96 that the pilot pressure Pslt is in the noise-generation regulated pressure range Rslts.

Specifically, when it is determined by the state determining portion 96 that the pilot pressure Pslt is in the noise-generation regulated pressure range Rslts, the hydraulic control portion 92 executes the first processing Mf when it is determined by the state determining portion 96 that the vehicle 10 is in the small background-noise state. On the other hand, when it is determined by the state determining portion 96 that the pilot pressure Pslt is in the noise-generation regulated pressure range Rslts, the hydraulic control portion 92 maintains the regulating control command signal Ssltc as the control command signal Sslt when it is determined by the vehicle 10 is not in the small background-noise state. It is noted that the working fluid oil is supplied from the EOP 60 (rather than the MOP 58) when it is determined that the vehicle 10 is in the small background-noise state in which the engine 12 is stopped. The above-described increase of the pump load, which is caused by execution of the first processing Mf, is increase of load acting on the EOP 60.

FIG. 7 is a flow chart showing a main part of a control routine executed by the electronic control apparatus 90, namely, a control routine that is executed for restraining the noise generated by vibration of the solenoid valve SLT in the pressure regulating state of the pressure regulating state. This control routine is executed, for example, in a repeated manner.

As shown in FIG. 7, the control routine is initiated with step S10 corresponding to function of the state determining portion 96, which is implemented to determine whether the pilot pressure Pslt is in the noise-generation regulated pressure range Rslts. When an affirmative determination is made at step S10, step S20 corresponding to function of the state determining portion 96 is implemented to determine whether the engine 12 is stopped. When an affirmative determination is made at step S20, step S30 corresponding to function of the state determining portion 96 is implemented to determine whether the running speed V is lower than the predetermined speed value V1. When an affirmative determination is made at step S30, step S40 corresponding to function of the state determining portion 96 is implemented to determine whether the air conditioner 62 is OFF. When an an affirmative determination is made at step S40, step S50 corresponding to function of the state determining portion 96 is implemented to determine whether the audio device 64 is OFF. When an affirmative determination is made at step S50, the control flow goes to step S60 corresponding to function of the hydraulic control portion 92, which is implemented to execute the first processing MF. That is, at step S60, for restraining generation of the vibration-based noise, the solenoid valve SLT is controlled with the control command signal Sslt in which the control electric current value Islt is changed to the noise-restraining electric current value Isltr as a countermeasure against vibration of the solenoid valve SLT. When a negative determination is made at step S10, step S20, step S30, step S40 or step S50, the control flow goes to step S70 corresponding to function of the hydraulic control portion 92, which is implemented to control the solenoid valve SLT with the regulating control, command signal Ssltc as a normal command signal of the control command signal Sslt.

As described above, in the present embodiment, the hydraulic control portion 92 is configured to output the control command signal Sslt that is applied to the solenoid 122 of the linear solenoid valve SLT, and is configured to output, as the control command signal Sslt, the regulating control command signal Ssltc by which the pilot pressure Pslt is to be regulated to the regulated pressure value that is dependent on the driving state of the vehicle 10. When the regulated pressure value is in the noise-generation regulated pressure range Rslts in which vibration-based noise is likely to be generated by vibration of the linear solenoid valve SLT that is operated with the regulating control command signal Ssltc being applied to the solenoid 122, the hydraulic control portion 92 is configured to output, as the control command signal Sslt, the noise-restraining command signal Ssltr by which generation of the vibration-based noise is restrained. Thus, in the pressure regulating state of the linear solenoid valve SLT, it is possible to restrain generation of the vibration-based noise resulting from the vibration of the linear solenoid valve SLT.

In the present embodiment, the control command signal Sslt generates or constitutes the control electric current that is applied to the solenoid 122 of the linear solenoid valve SLT, wherein the value Islt of the control electric current of the noise-restraining command signal Ssltr is the noise-restraining electric current value Isltr by which the pilot pressure Pslt is regulated outside the noise-generation regulated pressure range Rslts. Thus, it is possible to avoid use of the control command signal Sslt by which the regulated pressure value of the pilot pressure Pslt is in the noise-generation regulated pressure range Rslts, while avoiding heat generation of switching elements provided to generate the drive pulse signal. Thus, the vibration-based noise resulting from the vibration of the linear solenoid valve SLT can be restrained without problem of the heat generation of the switching elements.

In the present embodiment, the hydraulic control portion 92 is configured, when the state determining portion 96 determines that the vehicle 10 is in the small background-noise state, to output, as the control command signal Sslt, the noise-restraining command signal Ssltr in place of the regulating control command signal Ssltc, in the case in which the regulated pressure value of the pilot pressure Pslt is in the noise-generation regulated pressure range Rslts. Thus, the generation of the vibration-based noise resulting from the vibration of the linear solenoid valve SILT can be restrained in the state in which the vibration-based noise is hardly absorbed in the background noise and is audible and distinguished from the background noise. On the other hand, the hydraulic control portion 92 is configured, when the state determining portion 96 determines that the vehicle 10 is not in the small background-noise state, to output the regulating control command signal Ssltc as the control command signal Sslt, even in the case in which the regulated pressure value of the pilot pressure Pslt is in the noise-generation regulated pressure range Rslts. Thus, in the state in which the vibration-based noise is easily absorbed in the background noise and is hardly audible to be distinguished from the background noise, it is possible to avoid unnecessary increase of load of the pump, especially, load of the EOP 60, supplying the working fluid oil.

There will be described another embodiment of this invention. The same reference signs as used in the above-described embodiment will be used in the following embodiment, to identify the functionally corresponding elements, and descriptions thereof are not provided.

Second Embodiment

In the above-described first embodiment, the hydraulic control portion 92 executes the first processing Mf for restraining generation of the vibration-based noise. In this second embodiment, for restraining generation of the vibration-based noise, the hydraulic control portion 92 executes a second processing Ms in place of the first processing Mf.

Specifically, the noise-restraining command signal Ssltr is the control command signal Sslt in which the drive signal frequency Fre is set to the noise-restraining drive-signal frequency Frer that is different in frequency value from the regulating drive-signal frequency Free of the regulating control command signal Ssltc. When it is determined by the state determining portion 96 that the pilot pressure Pslt is in the noise-generation regulated pressure range Rslts, the hydraulic control portion 92 executes the second processing Ms by which the drive signal frequency Fre of the control command signal Sslt is changed from the regulating drive-signal frequency Free to the noise-restraining drive-signal frequency Frer. On the other hand, when it is determined by the state determining portion 96 that the pilot pressure Pslt is not in the noise-generation regulated pressure range Rslts, the hydraulic control portion 92 maintains the regulating control command signal Ssltc in the control command signal Sslt.

When it is determined by the state determining portion 96 that the pilot pressure Pslt is in the noise-generation regulated pressure range Rslts, the hydraulic control portion 92 executes the second processing Ms while maintaining the regulating electric current value Isltc as the control electric current value Islt in the control command signal Sslt. Owing to execution of the second processing Ms, the drive signal frequency Fre is set to the noise-restraining drive-signal frequency Frer, whereby it is possible to restrain pulsation of the pilot pressure Pslt, for example, which is in the noise-generation regulated pressure range Rslts. That is, with change of the drive signal frequency Fre, a movability of a spool 126 (see FIG. 4) of the solenoid valve SIT is changed. The noise-restraining drive-signal frequency Frer as the drive signal frequency Fre is a predetermined frequency that reduces the movability of the spool 126. With use of the noise-restraining drive-signal frequency Frer, the vibration of the solenoid valve SLT as such resulting from the pulsation of the pilot pressure Pslt is restrained whereby the vibration-based noise resulting from the vibration of the solenoid valve SLT is restrained.

With the drive signal frequency Fre being set to a high frequency value, the movement of the spool 128, which cause the vibration of the solenoid valve SLT, becomes less followable to the drive signal frequency Fre, namely, the followability of the movement of the spool 128 to the drive signal frequency Fre is reduced. Therefore, the noise-restraining drive-signal frequency Frer is set to a frequency value higher than the regulating drive-signal frequency Free. However, with increase of the drive signal frequency Fre, heat generation of the switching elements provided to generate the drive pulse signals is likely to be problematic. Thus, the noise-restraining drive-signal frequency Frer may be set to a frequency value lower than the regulating drive-signal frequency Free, for the purpose of avoiding resonance range of the vibration of the solenoid valve SIT: setting a frequency value by which the noise is hardly transmitted or avoiding a frequency value by which the noise becomes an annoying noise. However, if the drive signal frequency Fre were set to an excessively low frequency value, the pilot pressure Pslt could be hardly stable.

There is a possibility to make the vibration-based noise less audible to the vehicle operator, by fluctuating a tone of the noise in place of making the tone constant during generation of the vibration-based noise resulting from the vibration of the solenoid valve SLT. Where the spool 126 is made difficult to be moved by making the noise-restraining drive-signal frequency Frer fluctuated rather than being constant, setting the noise-restraining drive-signal frequency Frer to a frequency value fluctuated or changed periodically or cyclically is useful.

Since viscosity of the working fluid oil is changed depending on the working fluid temperature THoil, it is considered that the state of the vibration of the solenoid valve SLT is also changed depending on the working fluid temperature THoil. The noise-restraining drive-signal frequency Frer may be set to a constant frequency value that is dependent on the working fluid temperature THoil, or may be set to a frequency value that is changed periodically or cyclically depending on the working fluid temperature THoil.

Even if the vibration-based noise is generated due to vibration of the solenoid valve SL1, there is no need to execute the second processing Ms when a background noise in the interior of the vehicle 10 is so large that the vibration-based noise is not audible. When the drive signal frequency Fre is set to the noise-restraining drive-signal frequency Frer with execution of the second processing Ms, there is a possibility that heat generation of the switching elements provided to generate the drive pulse signals could be problematic. Since it is preferable that such a heat generation of the switching elements is avoided as much as possible, it is preferable that the second processing Ms is executed exclusively when the background noise in the interior of the vehicle 10 is small.

In this second embodiment, when it is determined by the state determining portion 96 that the pilot pressure Pslt is in the noise-generation regulated pressure range Rslts and that the vehicle 10 is in the small background-noise state, the hydraulic control portion 92 executes the second processing Ms. On the other hand, when it is determined by the state determining portion 96 that the vehicle 10 is not in the small background-noise state, the hydraulic control portion 92 maintains the regulating control command signal Ssltc as the control command signal Sslt, irrespective whether it is determined by the state determining portion 96 that the pilot pressure Pslt is in the noise-generation regulated pressure range Rslts.

This second embodiment is different from the above-described first embodiment in that the second processing Ms in place of the first processing Mf is executed at step S60 in the control routine shown in FIG. 7. Specifically, in the second embodiment, at step S60, for restraining generation of the vibration-based noise, the solenoid valve SLT is controlled with the control command signal Sslt in which the drive signal frequency Fre is changed to the noise-restraining drive-signal frequency Frer as a countermeasure against vibration of the solenoid valve SLT.

FIG. 8 is a time chart showing, by way of example, a case in which the second processing Ms is executed at step S60 of the control routine shown in FIG. 7, according to the second embodiment of the invention, which is other than the first embodiment of the invention shown in FIG. 6. In the case shown in FIG. 8, the vehicle 10 is stopped as a result of acceleration OFF that is made during motor running of the vehicle 10. In FIG. 8, a point t1 of time indicates a point of time at which the acceleration OFF is made, and a point t2 of time indicates a point of time at which the vehicle 10 is stopped as a result of the acceleration OFF. Further, a point t3 of time indicates a point of time at which, after the vehicle 10 has been stopped, the air conditioner 62 is turned OFF so that execution of the second processing Ms is started whereby the drive signal frequency Fre in the control command signal Sslt is changed from the regulating drive-signal frequency Frec to the noise-restraining drive-signal frequency Frer. In the case shown in FIG. 8, the noise-restraining drive-signal frequency Frer is set to a frequency value that is changed periodically rather than being constant in the execution of the second processing Ms.

As described above, in the present second embodiment, when the regulated pressure value of the pilot pressure Pslt is in the noise-generation regulated pressure range Rslts, the hydraulic control portion 92 is configured to output, as the control command signal Sslt, the noise-restraining command signal Ssltr by which generation of the vibration-based noise is restrained, such that the drive signal frequency Fre of the control command signal Sslt is changed to retrain pulsation of the pilot pressure Pslt outputted from the linear solenoid valve SLT. Thus, in the pressure regulating state of the linear solenoid valve SLT, it is possible to restrain generation of the vibration-based noise resulting from the vibration of the linear solenoid valve SLT.

In the present second embodiment, the control command signal Sslt generates or constitutes the drive signal that is applied to the solenoid 122 of the linear solenoid valve SLT, wherein the frequency of the drive signal of the regulating control command signal Ssltc is the regulating drive-signal frequency Free, and wherein the frequency of the drive signal of the noise-restraining command signal Ssltr is the noise-restraining drive-signal frequency Frer that is different from the regulating drive-signal frequency Free. Thus, it is possible to restrain pulsation of the pilot pressure Pslt outputted from the liner solenoid valve SLT, while avoiding problematic increase of the load acting on the pump. Thus, the vibration-based noise resulting from the vibration of the linear solenoid valve SLT can be restrained without problem of the increase of the pump load.

In the present second embodiment, the noise-restraining drive-signal frequency Frer is periodically changed, so that a tone of the vibration-based noise resulting from the vibration of the linear solenoid valve SLT is changed in addition to reduction of the pulsation of the pilot pressure Pslt. Thus, it is possible to make the vibration-based noise further less sensible or audible to the vehicle operator.

In the present second embodiment, the hydraulic control portion 92 is configured, when the state determining portion 96 determines that the vehicle 10 is in the small background-noise state, to output, as the control command signal Sslt, the noise-restraining command signal Ssltr in place of the regulating control command signal Ssltc in the case in which the regulated pressure value of the pilot pressure Pslt is in the noise-generation regulated pressure range Rslts. Thus, the generation of the vibration-based noise resulting from the vibration of the linear solenoid valve SLT can be restrained in the state in which the vibration-based noise is hardly absorbed in the background noise and is audible and distinguished from the background noise. On the other hand, the hydraulic control portion 92 is configured, when the state determining portion 96 determines that the vehicle 10 is not in the small background-noise state, to output the regulating control command signal Ssltc as the control command signal Sslt, even in the case in which the regulated pressure value of the pilot pressure Pslt is in the noise-generation regulated pressure range Rslts. Thus, in the state in which the vibration-based noise is easily absorbed in the background noise and is hardly audible to be distinguished from the background noise, it is possible to avoid unnecessary heat generation of the switching elements provided to generate the drive pulse signals.

While the preferred embodiments of this invention have been described in detail by reference to the drawings, it is to be understood that the invention may be otherwise embodied.

For example, for restraining the generation of the vibration-based noise resulting from the vibration of the solenoid valve SLT, the first processing Mf is executed with the regulating drive-signal frequency Free as the drive signal frequency Fre being maintained in the above-described first embodiment, while the second processing Ms is executed with the regulating electric current value Isltc as the control electric current value Islt being maintained in the above-described second embodiment. However, these arrangements may be modified. For example, the first processing Mf and the second processing Ms may be both executed for restraining the generation of the vibration-based noise resulting from the vibration of the solenoid valve SIT. In this modified arrangement, the control electric current value Islt is changed to the noise-restraining electric current value Isltr and the drive signal frequency Fre is changed to the noise-restraining drive-signal frequency Frer. Therefore, when it is determined by the state determining portion 96 that the pilot pressure Pslt is in the noise-generation regulated pressure range Rslts, the hydraulic control portion 92 may execute at least one of the first processing Mf and the second processing Ms. Further, when it is determined by the state determining portion 96 that the pilot pressure Pslt is in the noise-generation regulated pressure range Rslts and that the vehicle 10 is in the small background-noise state, the hydraulic control portion 92 may execute at least one of the first processing Mf and the second processing Ms. In this modified arrangement, too, it is possible to obtain substantially the same technical advantages as in the above-described first and second embodiments.

In the above-described first and second embodiments, it is determined that the vehicle 10 is in the small background-noise state when four conditions are all satisfied, wherein the four conditions consist of a condition A in that the engine 12 is stopped, a condition B in that the running speed V of the vehicle 10 is lower than the predetermined speed value V1, a condition C in that the air conditioner 62 is OFF and a condition D in that the audio device 64 is OFF. However, this arrangement may be modified. The small background-noise state may be a state of the interior of the vehicle 10 in which the vibration-based noise resulting from the vibration of the linear solenoid valve SLT is audible. Thus, all of the conditions A, B, C, D do not have be satisfied for the determination that the vehicle 10 is in the small background-noise state. For example, the determination that the vehicle 10 is in the small background-noise state may be made when only one of the above-described conditions A, B, C, D is satisfied. In this modified arrangement, too, the generation of the vibration-based noise can be restrained when the engine 12 is stopped, the vehicle 10 is stopped or running at a low running speed, the air conditioner 62 is OFF or the audio device 64 is OFF, namely, in a state in which the vibration-based noise is hardly absorbed in the background noise and is audible and distinguished from the background noise. On the other hand, when the engine 12 is operated, the vehicle 10 is running at a running speed that is not lower than a certain speed value, the air conditioner 62 is operated or sound is emitted from the audio device 64, namely, when the vibration-based noise is easily absorbed in the background noise and is hardly audible to be distinguished from the background noise, it is possible to avoid unnecessary increase of load of a pump supplying the working fluid oil and to avoid unnecessary heat generation of switching elements provided to generate the drive pulse signals.

In the above-described first and second embodiments, the first processing Mf and the second processing Ms are executed for the linear solenoid valve (configured to regulate the hydraulic pressure in the step-variable transmission portion 22) in the form of the solenoid valve SLT configured to regulate the line pressure PL. However, this is not essential. For example, the present invention is applicable also to any one of the solenoid valve SL1, SL2, SL3, SL4 configured to regulate the respective hydraulic pressures Pc1, Pc2, Pb1, Pb2. Further, the hydraulic control unit 56 shown in FIG. 4 may be modified such that a control valve A is operated by a pilot pressure C outputted from a linear solenoid valve B whereby a hydraulic pressure D inputted to the control valve A through its input port is regulated, and the regulated hydraulic pressure is supplied to the engagement devices CB. In this modified hydraulic control unit, the linear solenoid valve B regulating the pilot pressure C and/or a linear solenoid valve E regulating the hydraulic pressure D corresponds to the linear solenoid valve configured to regulate a hydraulic pressure in a transmission that is to be provided in a vehicle. That is, the present invention is applicable also to the linear solenoid valves B, E in the modified hydraulic control unit. Further, the transmission that is to be provided in a vehicle may include a fluid-operated type power transmitting device such as a torque converter having a lockup clutch. In this modification, the present invention is applicable also to a linear solenoid valve configured to regulate a hydraulic pressure in the transmission, which is provided to activate the lockup clutch.

It is noted that, when the first processing Mf is executed, the regulating electric current value, by which the hydraulic pressure having a target pressure value is outputted from the linear solenoid valve, is changed to the noise-restraining electric current value, whereby the outputted hydraulic pressure is changed. It is preferable that the first processing Mf is executed for a liner solenoid valve that is hot problematic by the change of the outputted hydraulic pressure. As described above, where the first processing Mf is executed for the solenoid valve SLT, the pilot pressure Pslt as the outputted hydraulic pressure is increased whereby the line pressure PL is increased. The increased line pressure PL is an original pressure for each of the hydraulic pressures Pc1, Pc2, Pb1, Pb2, so that the increase of the pilot pressure Pslt is not problematic. Further, where the first processing Mf is executed for the solenoid valves SL1, SL2, SL3, SL4, the increases of the hydraulic pressures Pc1, Pc2, Pb1, Pb2 do not cause change of the operation states of the engagement devices CB when the engagement devices CB are fully engaged, so that the increases of the hydraulic pressures Pc1, Pc2, Pb1, Pb2 are not problematic, either.

In the above-described first embodiment, the noise-generation regulated pressure range Rslts is a low range of the pilot pressure Pslt, as shown in FIG. 6. However, the noise-generation regulated pressure range Rslts may be a middle range of the pilot pressure Pslt, depending on characteristics of the linear solenoid valve. Irrespective whether the noise-generation regulated pressure range Rslts is a low or middle range of the pilot pressure Pslt, the first processing Mf may be executed such that the pilot pressure Pslt is deviated from the noise-generation regulated pressure range Rslts. Or alternatively, the generation of the vibration-based noise may be restrained by execution of the second processing Ms even without deviating the pilot pressure Pslt from the noise-generation regulated pressure range Rslts.

In the above-described first and second embodiments, the first processing Mf and/or the second processing Ms may be executed when the regulated pressure value of the line pressure PL, which is dependent on the vehicle driving state, is in the certain pressure range Rpl, namely, when the regulated pressure value of the pilot pressure Pslt, which is dependent on the vehicle driving state, is in the noise-generation regulated pressure range Rslts, without determining whether the vehicle 10 is in the small background-noise state or not. In this modified arrangement, steps S20 through S50 may be omitted in the control routine shown FIG. 7.

In the above-described first embodiment, the hydraulic pressure is regulated by the regulating control command signal Ssltc to the regulate pressure value that is dependent on the vehicle driving state in the form of the input torque inputted to the step-variable transmission portion 22. However, the vehicle driving state does not necessarily have to be the input torque inputted to the step-variable transmission portion 22, but may be, for example, a degree of need to cool the first rotating machine MG or second rotating machine MG2, a degree of need to lubricate components of the drive-force transmitting device 16, or the running speed V of the vehicle 10.

In the above-described first and second embodiments, the continuously-variable transmission portion 20 may be a transmission mechanism the differential state of which is limited by controlling a clutch or brake connected to one of the rotary elements of the differential mechanism 32. Further, the differential mechanism 32 may be a planetary gear set of a double-pinion type, or may be replaced by a differential mechanism which includes a plurality of planetary gear sets having four or more rotary elements. Further, the differential mechanism 32 may be replaced by a differential gear device including a pinion rotated by the engine 12, and a pair of bevel gears which mesh with the pinion and to which the first motor/generator MG1 and the intermediate transmitting member 30 are respectively connected. Further, the differential mechanism 32 may be replaced by a mechanism which includes two or more planetary gear sets rotary elements of which are connected to each other and/or operatively connected to the engine, rotating machine and drive wheels, in a power transmittable manner.

In the above-described first and second embodiments, the vehicle 10 has the transmission device (composite transmission) 40. However, the present invention is applicable also to a vehicle having the step-variable transmission portion 22 without the continuously-variable transmission portion 20. That is, the present invention is applicable to any vehicle as long as the vehicle has a linear solenoid valve configured to regulate a hydraulic pressure in a transmission provided in the vehicle. The transmission may be a planetary-gear-type automatic transmission such as the above-described step-variable transmission portion 22, or any other type of automatic transmission such as (i) a known DCT (Dual Clutch Transmission) which is a synchronous meshing parallel two-axes type automatic transmission having two input shafts which are provided with hydraulically-operated engagement devices and which are operatively connected to respective two shifting units having respective even-numbered gear positions and odd-numbered gear positions, and (ii) an automatic transmission that is provided with first and second drive-force transmitting paths between input and output rotary members of the automatic transmission wherein the first drive-force transmitting path is established by engagement of a hydraulically-operated first engagement device and the second drive-force transmitting path is established by engagement of a hydraulically-operated second engagement device.

While the preferred embodiments of this invention have been described in detail by reference to the drawings, it is to be understood that the embodiments described above are given for illustrative purpose only, and that the present invention may be embodied with various modifications and improvements which may occur to those skilled in the art.

NOMENCLATURE OF ELEMENTS

22: mechanically-operated step-variable transmission portion (vehicle transmission)
90: electronic control apparatus (control apparatus)
92: hydraulic control portion
96: state determining portion
122: solenoid
SLT, SL1-SL4: solenoid valves (linear solenoid valves)

What is claimed is:

1. A control apparatus for a linear solenoid valve configured to regulate a hydraulic pressure in a transmission that is to be provided in a vehicle, said control apparatus comprising:
    a hydraulic control portion configured to output a control command signal that is applied to a solenoid of the linear solenoid valve,
    wherein said hydraulic control portion is configured to output, as the control command signal, a regulating control command signal by which the hydraulic pressure is to be regulated to a regulated pressure value that is dependent on a driving state of the vehicle, and
    wherein, when the regulated pressure value is in a certain pressure range in which vibration-based noise is likely to be generated by vibration of the linear solenoid valve that is operated with the regulating control command signal being applied to the solenoid, said hydraulic control portion is configured to output, as the control command signal, a noise-restraining command signal by which generation of the vibration-based noise is restrained.

2. The control apparatus according to claim 1,
    wherein the control command signal generates a control electric current that is applied to the solenoid of the linear solenoid valve, and
    wherein a value of the control electric current of the noise-restraining command signal is a noise-restraining electric current value by which the hydraulic pressure is regulated outside said certain pressure range.

3. The control apparatus according to claim 1,
    wherein the control command signal constitutes a drive signal that is applied to the solenoid of the linear solenoid valve,
    wherein a frequency of the drive signal of the regulating control command signal is a regulating drive-signal frequency, and
    wherein a frequency of the drive signal of the noise-restraining command signal is a noise-restraining drive-signal frequency that is different from the regulating drive-signal frequency.

4. The control apparatus according to claim 3,
    wherein the noise-restraining drive-signal frequency is periodically changed.

5. The control apparatus according to claim 1, further comprising a state determining portion configured to determine whether a background noise in an interior of the vehicle is in a vibration-based-noise audible level in which the vibration-based noise is audible in the interior of the vehicle, wherein said hydraulic control portion is configured, when said state determining portion determines that the background noise in the interior of the vehicle is in said vibration-based-noise audible level, to output, as the control command signal, the noise-restraining command signal in place of the regulating control command signal, in a case in which the regulated pressure value is in said certain pressure range, and wherein said hydraulic control portion is configured, when said state determining portion determines that the background noise in the interior of the vehicle is not in said vibration-based-noise audible level, to output the regulating control command signal as the control command signal, even in said case in which the regulated pressure value is in said certain pressure range.

6. The control apparatus according to claim 1, further comprising a state determining portion configured to determine whether the regulated pressure value dependent on the driving state of the vehicle is in said certain pressure range, wherein said hydraulic control portion is configured to output the noise-restraining command signal as the control command signal, when said state determining portion determines that the regulated pressure value is in said certain pressure range.

\* \* \* \* \*